(12) United States Patent
Tu

(10) Patent No.: US 7,353,460 B2
(45) Date of Patent: Apr. 1, 2008

(54) WEB SITE NAVIGATION UNDER A HIERARCHICAL MENU STRUCTURE

(75) Inventor: Robert F. Z. Tu, Gilbert, AZ (US)

(73) Assignee: Robert Tu Consulting Inc., Tempe, AZ (US)

( * ) Notice: Subject to any disclaimer, the term of this patent is extended or adjusted under 35 U.S.C. 154(b) by 648 days.

(21) Appl. No.: 10/213,723

(22) Filed: Aug. 6, 2002

(65) Prior Publication Data

US 2004/0027391 A1 Feb. 12, 2004

(51) Int. Cl.
G06F 3/048 (2006.01)
G06F 3/00 (2006.01)

(52) U.S. Cl. .............. 715/810; 715/733; 715/738; 715/739; 715/760; 715/764; 715/781; 715/783; 715/806; 715/825

(58) Field of Classification Search .......... 715/513, 715/514, 517, 520, 760, 764, 781, 783, 739, 715/810, 825, 733, 738, 806
See application file for complete search history.

(56) References Cited

U.S. PATENT DOCUMENTS

| | | | | |
|---|---|---|---|---|
| 5,572,643 A * | 11/1996 | Judson | ................ | 709/218 |
| 5,600,778 A * | 2/1997 | Swanson et al. | ............ | 715/762 |
| 5,801,702 A * | 9/1998 | Dolan et al. | ................ | 715/854 |
| 5,854,630 A * | 12/1998 | Nielsen | .............. | 715/739 |
| 6,035,330 A * | 3/2000 | Astiz et al. | ................ | 709/218 |
| 6,144,991 A * | 11/2000 | England | .............. | 709/205 |
| 6,243,700 B1 * | 6/2001 | Zellweger | ............... | 707/3 |
| 6,351,767 B1 * | 2/2002 | Batchelder et al. | ......... | 709/218 |
| 6,385,642 B1 * | 5/2002 | Chlan et al. | ............... | 709/203 |
| 6,434,564 B2 * | 8/2002 | Ebert | ........................ | 707/100 |
| 6,456,303 B1 * | 9/2002 | Walden et al. | .............. | 715/705 |
| 6,525,748 B1 * | 2/2003 | Belfiore et al. | ............. | 715/855 |
| 6,651,217 B1 * | 11/2003 | Kennedy et al. | ............ | 715/507 |
| 6,820,111 B1 * | 11/2004 | Rubin et al. | ................ | 709/203 |
| 6,950,980 B1 * | 9/2005 | Malcolm | .................... | 715/505 |
| 6,967,390 B2 * | 11/2005 | Johnson | ...................... | 715/744 |
| 6,990,498 B2 * | 1/2006 | Fenton et al. | ............... | 707/102 |
| 7,281,199 B1 * | 10/2007 | Nicol et al. | .............. | 715/500.1 |

(Continued)

OTHER PUBLICATIONS

Microsoft Internet Explorer, Copyright 2001, Microsoft Corp., Version 6.0.2800.1106xpsp1.020828-1920CO.*

(Continued)

Primary Examiner—Tadesse Hailu
Assistant Examiner—Alvin H Tan
(74) Attorney, Agent, or Firm—Schmeiser, Olsen & Watts

(57) ABSTRACT

A method, system, and computer display device that uses a hierarchical menu structure to enable a user navigate through a linked web-page system. A computer code and a display screen of the computer display device enables the user to navigate through the linked web-page system in accordance with the hierarchical menu structure and in accordance with supporting features such as navigational persistence and page content persistence. The display screen comprises a display of: an uppermost top-level of the linked web-page system; a list of top-level categories under the uppermost top-level; a list of sub-level categories linked to a user-selected top-level category; a list of menu items held by each sub-level category; and a web page linked from a user-selected menu item from the menu items held by a sub-level category.

2 Claims, 17 Drawing Sheets

U.S. PATENT DOCUMENTS

| | | | | |
|---|---|---|---|---|
| 2001/0010059 | A1* | 7/2001 | Burman et al. | 709/224 |
| 2001/0029527 | A1* | 10/2001 | Goshen | 709/218 |
| 2002/0013834 | A1* | 1/2002 | Esakov et al. | 709/223 |
| 2002/0103789 | A1* | 8/2002 | Turnbull et al. | 707/3 |
| 2002/0156846 | A1* | 10/2002 | Rawat et al. | 709/203 |
| 2003/0043187 | A1* | 3/2003 | Li | 345/749 |
| 2003/0112467 | A1* | 6/2003 | McCollum et al. | 358/1.18 |
| 2003/0229900 | A1* | 12/2003 | Reisman | 725/87 |
| 2004/0030649 | A1* | 2/2004 | Nelson et al. | 705/44 |
| 2007/0234202 | A1* | 10/2007 | Lyness | 715/513 |

OTHER PUBLICATIONS

Skonnard, Inside Knowledge: Client Persistence, Dec. 1999, Microsoft Corporation.*

Microsoft Internet Explorer, Copyright 2001, Microsoft Corp., Version 6.0.2800.1106.xpsp1.020828-1920CO, figures 3, 4, 5.*

Zoot Banking Systems, Kairos Loan Organization & Application Processing System Functional Specifications, May 27, 2002, Zoot Banking Systems, pp. 1-15.*

Cheshire Network Services, "Frequently Asked Questions—What is a cookie?", May 2, 2001, http://web.archive.org/web/20010502053729/http://www.cheshire.net/tech/FAQ/cookie.html.*

* cited by examiner

CONSULTING — 30

| Company Profile | Products/Services | Concepts/Technology | Support/Demo | Contact |
|---|---|---|---|---|

41 — 42 — 43 — 44 — 45 — 32

16

Today: 6/30/2002 — 34

Example: — 47
- Invoice System
- Order System
- Calendar/Dispatcher

Style — 48
- Style Settings

Support — 49
- Support
- Applications
- Service Providers
- Consultancy

Technology — 50
- SDAS advantage

---

Edit Invoice — 36

Name/Company [ ]    Contact [ ]

Address [ ]    Bill Address [ ]    Ship Address [ ]

City/State/Zip [ ] [ ]    Address [ ]

Phone [ ]    City/State/Zip [ ] [ ]

Phone [ ]

Inv Date [6/30/02]    Ordered [6/30/02]    Ship Date [ ]    PO # [ ]    Via [Select a Value]    Tracking [ ]    Term [Select a Value]

Item Qty    Description    Price    Extension

Percent [0.00]    Total [0.00]
Sale Tax [0.00]
S/H [0.00]
Labor [0.00]
Grand Total [0.00]

[Imp Customer] — 52    [Add Line Item]    [Refresh]    [Finalize]    [New Invoice]

| | Company Profile | Products/Services | Concepts/Technology | Support/Demo | Contact |
|---|---|---|---|---|---|

CONSULTING

Today: 6/30/2002

Example
- Invoice System
- Order System
- Calendar/Dispatcher

Style
- Style Settings

Support
- Support
- Applications
- Service Providers
- Consultancy

Technology
- SDAS advantage

Import Customer

Type a search String in the box, select a search Criteria, then click Go button

Basic Form Search:

Basic Form Search String [         ]  ★Search  ★List All

Search By  ⦿ Name  ○ Company  ○ Address 1  ○ City

| ID | Name | Company | Address 1 | City | State |
|---|---|---|---|---|---|
| ★Sel | Dales Jones | Jones and Co. | 1650 Magnolia Blvd | Baldwin Park | CA |
| ★Sel | Matt Dolson | Vivace Corp. | 1320 Grand Ave. | Carson | CA |
| ★Sel | Kathy Mallory | Oak Mill, Inc. | 17331 San Ramon | Stanton | CA |
| ★Sel | Thomas Harrison | Tom Harrison Assoc. | 3157 Cork Street | Long Beach | CA |
| ★Sel | Glen Goldberg | Golden State School | 4300 Campus Drive | Irvine | CA |
| ★Sel | Malcolm Jones | Jana Reavus Corp. | 1236 Main Street | Costa Mesa | CA |
| ★Sel | John D. Fenney | South Bay Plumbing | 1772 Carol Drive | Cerritos | CA |
| ★Sel | Dennis Johnson | RDII Environmental | 1400 Sunkist Dr., Ste.200 | Newport Beach | CA |

CONSULTING — 30, 32

- Company Profile — 41
- Products/Services — 42
- Concepts/Technology — 43
- Support/Demo — 44
- Contact — 45

Today: 6/30/2002 — 34

Examples — 47
- Invoice System
- Order System
- Calendar/Dispatcher

Style — 48
- Style Settings

Support — 49
- Support
- Applications
- Service Providers
- Consultancy

Technology — 50
- SDAS advantage

Edit Invoice — 36

Name/Company: Vivace Corp.    Contact: Matt Dolson
Bill Address                  Ship Address
Address: 1320 Grand Ave.
City/State/Zip: Carson  CA  90749   City/State/Zip:
Phone: 213-834-2511                 Phone:

Inv Date: 7/25/02   Ordered: 7/25/02   Ship Date:   PO #:   Via: Select a Value   Tracking:   Term: Select a Value Item Qty    Description                    Price   Extension Total     0.00
                                Percent 0.00  Sale Tax  0.00
                                              S/H       0.00
                                              Labor     0.00
                                              Grand Total 0.00

[Imp Customer]  [Add Line Item]  [Refresh]  [Finalize]  [New Invoice]

FIG. 11

WEB SITE NAVIGATION UNDER A HIERARCHICAL MENU STRUCTURE

BACKGROUND OF THE INVENTION

1. Technical Field

The present invention relates generally to web site navigation, and more specifically to web site navigation in accordance with a hierarchical menu structure.

2. Related Art

The Internet has become a popular mechanism to search and obtain information for nearly any item or topic, and the Internet is fast approaching the status as a global standard for such use. The ease of information exchange has also resulted in a desirability of using the Internet as a enhanced global business tool in addition to being used for information exchange. Although the Internet has performed relatively well as a global information exchange, the Internet has not met the needs nor solved many of the concerns of the business community. Broad business use of the Internet has not advanced beyond a basic electronic catalog at best. Since it's inception, the Internet has remained burdened by limitations, including the limitations of quality of the content and of quality of retrieval of information from the Internet. Additionally, navigation across the Internet is based on random links and it is easy to get lost within a web site that has a large number of web pages.

Thus, there is a need for a method, software, user interface, etc. which improves the quality of the content and retrieval of information from the Internet, and which helps to prevent an Internet user from getting lost within a web site that has a large number of pages.

SUMMARY OF THE INVENTION

In first embodiments, the present invention provides a computer display device, comprising a display screen, said display screen displaying a menu presentation interface for enabling a user of a linked web-page system to navigate through the linked web-page system, said menu presentation interface comprising a display of:

a list of top-level categories such that the top-level categories are categories of an uppermost top-level of the web-page navigation system;

a list of sub-level categories linked to a selected top-level category of the top-level categories;

a list of menu items held by each sub-level category; and a web page linked from a selected menu item of the menu items held by a first sub-level category of the sub-level categories.

In second embodiments, the present invention provides a computer display device, comprising a display screen, said display screen displaying a hierarchical menu structure for enabling a user of a linked web-page system to navigate through the linked web-page system, said hierarchical menu structure comprising:

an uppermost top-level;

I top-level categories denoted as $T(1)$, $T(2)$, . . . $T(I)$, wherein $I \geq 2$, and wherein the uppermost top-level is divided into the I top-level categories;

$J_1$ sub-level categories associated with top-level category $T(i)$, wherein $J_1$ is a function of i, wherein $J_i \geq 1$, and wherein the $J_1$ sub-level categories are denoted as $S(i,1)$, $S(i,2)$, . . . , $S(i,J_i)$, for $i=1, 2, \ldots, I$; and $K_{1j}$ menu items held by sub-level category $S(i,j)$, wherein $K_{1j}$ is a function of i and j, wherein $K_{ij} \geq 1$, wherein the $K_{1j}$ menu items are denoted as $M(i,j,1)$, $M(i,j,2)$, . . . , $M(i,j,K_{1j})$, and wherein the menu item $M(i,j,k)$ is linked to a web page $W(i,j,k)$, for $i=1, 2, \ldots, I$ and $j=1, 2, \ldots, J_i$ and $k=1, 2, \ldots, K_{ij}$.

In third embodiments, the present invention provides a computer display device, comprising a display screen, said display screen displaying a hierarchical menu structure for enabling a user of a linked web-page system to navigate through the linked web-page system, said hierarchical menu structure having a navigational state $(\alpha, \beta, \gamma)$, said hierarchical menu structure comprising:

an uppermost top-level;

I top-level categories denoted as $T(1)$, $T(2)$, . . . , $T(I)$, wherein $I \geq 2$, and wherein the uppermost top-level is divided into the I top level categories;

$J_1$ sub-level categories associated with top-level category $T(i)$, wherein $J_1$ is a function of i, wherein $J_1 \geq 1$, and wherein the $J_1$ sub-level categories are denoted as $S(i,1)$, $S(i,2)$, . . . , $S(i,J_1)$, for $i=1, 2, \ldots, I$; and $K_{ij}$ menu items held by sub-level category $S(i,j)$, wherein $K_{1j}$ is a function of i and j, wherein $K_{1j} \geq 1$, wherein the $K_{1j}$ menu items are denoted as $M(i,j,1)$, $M(i,j,2)$, . . . , $M(i,j,K_{1j})$, and wherein the menu item $M(i,j,k)$ is linked to a web page $W(i,j,k)$, for $i=1, 2, \ldots, I$ and $j=1, 2, \ldots, J_i$ and $k=1, 2, \ldots, K_{1j}$, said display screen comprising a display of:

$(T(1), T(2), \ldots, T(I))$, $(S(\alpha,\beta), (M(\alpha,\beta,\gamma), \gamma=1, 2, \ldots, K_{\alpha\beta}), \beta=1, 2, \ldots, J_\alpha)$, and $W(\alpha,\beta,\gamma)$, wherein $\alpha$ is selected from the group consisting of 1, 2, . . . , and I, wherein $\beta$ is selected from the group consisting of 1, 2, . . . , and $J_\alpha$, and wherein $\gamma$ selected from the group consisting of 1, 2, . . . , and $K_{\alpha\beta}$.

In fourth embodiments, the present invention provides a computer program product, comprising a computer usable medium having a computer readable program code embodied therein for enabling a user of a linked web-page system to navigate through the linked web-page system in accordance with a hierarchical menu structure, said hierarchical menu structure comprising:

an uppermost top-level;

I top-level categories denoted as $T(1)$, $T(2)$, . . . , $T(I)$, wherein $I \geq 2$, and wherein the uppermost top-level is divided into the I top level categories;

$J_1$ sub-level categories associated with top-level category $T(i)$, wherein $J_i$ is a function of i, wherein $J_1 \geq 1$, and wherein the $J_1$ sub-level categories are denoted as $S(i,1)$, $S(i,2)$, . . . , $S(i,J_i)$, for $i=1, 2, \ldots, I$; and $K_{1j}$ menu items held by sub-level category $S(i,j)$, wherein $K_{ij}$ is a function of i and j, wherein $K_{ij} \geq 1$, wherein the $K_{1j}$ menu items are denoted as $M(i,j,1)$, $M(i,j,2)$, . . . , $M(i,j,K_{1j})$, and wherein the menu item $M(i,j,k)$ is linked to a web page $W(i,j,k)$, for $i=1, 2, \ldots, I$ and $j=1, 2, \ldots, J_i$ and $k=1, 2, \ldots, K_{1j}$, said computer code comprising an algorithm adapted to generate, on a display screen of a computer display device, a display of a navigational state $(\alpha, \beta, \gamma)$ of the hierarchical menu structure, said display comprising a depiction of:

$(T(1), T(2), \ldots, T(I))$, $(S(\alpha,\beta), (M(\alpha,\beta,\gamma), \gamma=1, 2, \ldots, K_{\alpha\beta}), \beta=1, 2, \ldots, J_\alpha)$, and $W(\alpha,\beta,\gamma)$, wherein α is selected from the group consisting of 1, 2, ..., and I, wherein β is selected from the group consisting of 1, 2, ..., and $J_\alpha$, and wherein γ selected from the group consisting of 1, 2, ..., and $K_{\alpha\beta}$.

In fifth embodiments, the present invention provides a computer program product, comprising a computer usable medium having a computer readable program code embodied therein for enabling a user of a linked web-page system to navigate through the linked web-page system, said computer code comprising an algorithm adapted to:

record, in a computer-readable medium, a sequence of navigational links selected by the user, wherein each navigational link is a link to a web page of the linked web-page system;

record, in the computer-readable medium, the web pages to which the navigational links are linked; and in response to a subsequent selection of a first navigational link to a dynamic web page such that the first navigational link is one of the previously selected navigational links, display the dynamic web page on a display screen of a computer display device and in accordance with page content persistence.

In sixth embodiments, the present invention provides a computer program product, comprising a computer usable medium having a computer readable program code embodied therein for enabling a user of a linked web-page system to navigate through the linked web-page system, said computer code comprising an algorithm adapted to:

record, in a computer-readable medium, a sequence of navigational links selected by the user, wherein each navigational link is a link to a web page of the linked web-page system; and execute code selected from a plurality of alternative code in dependence on said recorded sequence.

In seventh embodiments, the present invention provides a computer usable medium having a computer readable program code embodied therein for enabling a user of a linked web-page system to navigate through the linked web-page system, said computer code comprising an algorithm adapted to enable the user to select a sequence of navigational links, wherein each navigational link is a link to a web page of the linked web-page system, and wherein at least one of the navigational links available for selection by the user and the web pages to which the available navigational links are linked is a function of an identity of a computer that the user is coupled to for navigating through the linked web-page system.

In eighth embodiments, the present invention provides an access control method, comprising:

receiving, by a web site, a request for access to the web site by a computer that is separated from the web site by a communication link;

determining, by the web site, an address of the computer; and refusing the user access to the web site if the determining determines that the address of the computer is not acceptable for access to the web site.

In ninth embodiments, the present invention provides a computer program product, comprising a computer usable medium having a computer readable program code embodied therein for controlling access to a web site, said computer code being coupled to the web site, said computer code comprising an algorithm adapted to:

receive a request for access to the web site by a user from a computer that is separated from the web site by a communication link;

determine an address of the computer; and refuse the user access to the web site if the algorithm determines that the address of the computer is not acceptable for access to the web site.

In tenth embodiments, the present invention provides a computer display device comprising a display screen, said display screen adapted to display each of a first hierarchical menu structure $H_1$ and a second hierarchical menu structure $H_2$ wherein a chained hierarchical menu system comprises $H_1$ and $H_2$, wherein the chained hierarchical menu system enables a user of a linked web-page system to navigate through the linked web-page system, and wherein $H_1$ and $H_2$ independently comprise:

an uppermost top-level;

I top-level categories denoted as T(1), T(2), ... T(I), wherein $I \geq 2$, and wherein the uppermost top-level is divided into the I top-level categories;

$J_1$ sub-level categories associated with top-level category T(i), wherein $J_1$ is a function of i, wherein $J_i \geq 1$, and wherein the $J_1$ sub-level categories are denoted as S(i,1), S(i,2), ..., S(i,$J_1$), for i=1, 2, ..., I; and $K_{1j}$ menu items held by sub-level category S(i,j), wherein $K_{1j}$ is a function of i and j, wherein $K_{1j} \geq 1$, wherein the $K_{1j}$ menu items are denoted as M(i,j,1), M(i,j,2), ..., M(i,j,$K_{1j}$), and wherein the menu item M(i,j,k) is linked to a web page W(i,j,k), for i=1, 2, ..., I and j=1, 2, ..., $J_i$ and k=1, 2, ..., $K_{1j}$, wherein $H_1$ is linked to $H_2$ from the uppermost top-level of $H_1$, a top-level category of $H_1$, or a menu item of $H_1$.

The present invention beneficially provides a method, software, user interface, etc. which improve the quality of the content and retrieval of information from the Internet, and which helps to prevent an Internet user from getting lost within a web site that has a large number of pages.

BRIEF DESCRIPTION OF THE DRAWINGS

FIG. 9 depicts the display screen of FIG. 8 with the sub-level area filled with sub-level categories and associated menu items relating to selection of the "Support/Demo" top-level category and with the web-page area containing a web page linked from the "Invoice System" menu item with data fields unfilled, in accordance with embodiments of the present invention.

FIG. 10 depicts the display screen of FIG. 9 showing the web-page area filled with "Import Customer" content following selection of the "Imp Customer" button in FIG. 9, in accordance with embodiments of the present invention.

FIG. 11 depicts the display screen of FIG. 9 wherein the "Invoice System" web page in the web-page area with the data fields filled with data derived from the "Import Customer" web page of FIG. 10, in accordance with embodiments of the present invention.

DETAILED DESCRIPTION OF THE INVENTION

Figure 1:
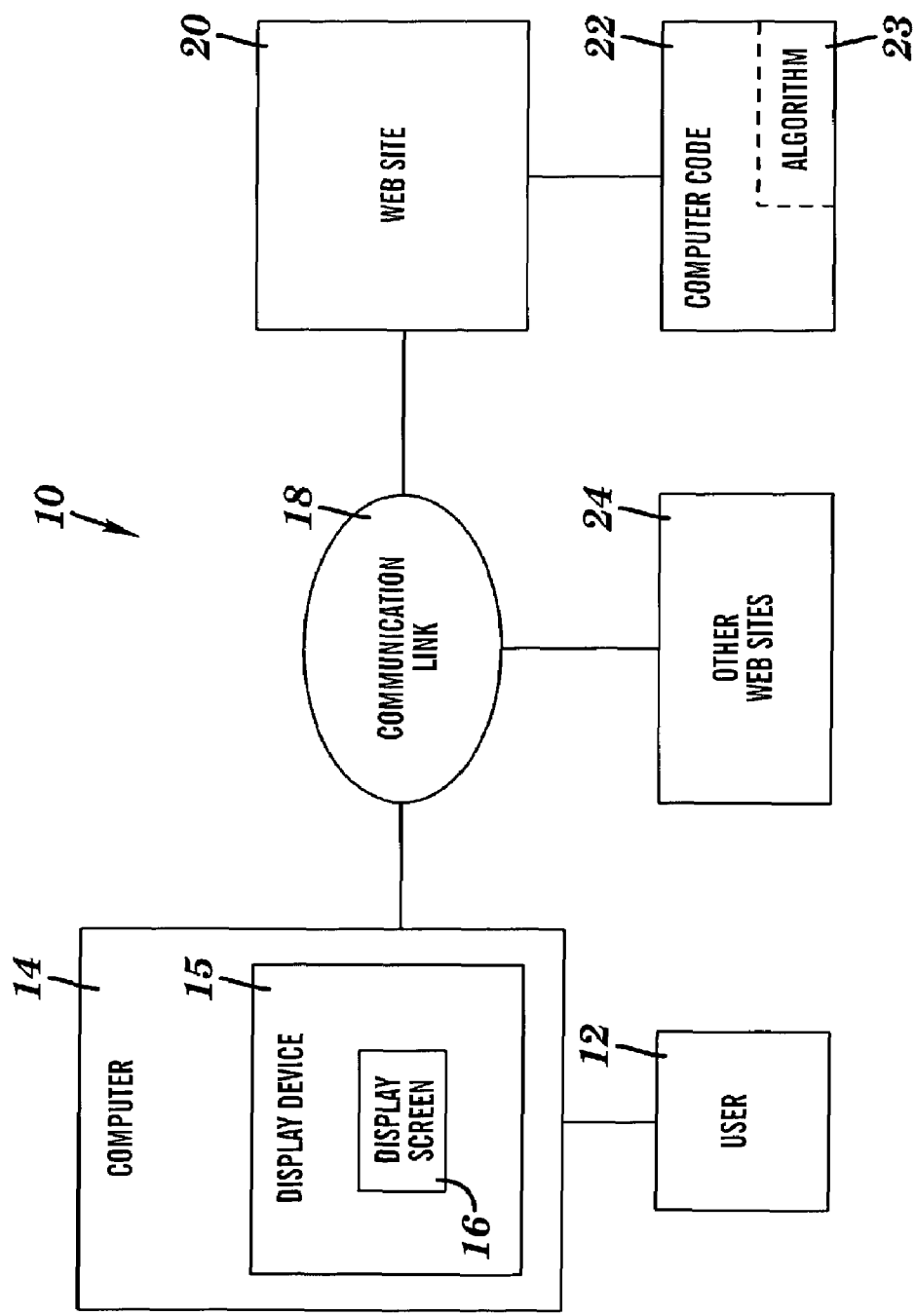
FIG. 1 depicts a network with a computer comprising a computer display device having a display screen for navigating through a linked web-page system in accordance with a hierarchical menu structure, in accordance with embodiments of the present invention.

FIG. 1 depicts a network 10 for navigating through a linked web-page system in accordance with a hierarchical menu structure, in accordance with embodiments of the present invention. The network 10 comprises a computer 14, a communication link 18, a web site 20, and other web sites 24. The computer 14 comprises a computer display device 15 having a display screen 16. The computer 14 is coupled to the web site 20 through the communication link 18. A user 12 is coupled to the computer 14. The web site 20 and the other web sites 24 are coupled to the communication link 18. The communication link 18 integrates use of the web site 20 and the other web sites 24 by the user 12.

The computer 14 comprises any data processing device that has an input device (e.g., keyboard, mouse, etc.), the computer display device 15, a computer-readable medium (e.g., a memory), for storing a software and data, and a processor for executing said software. As examples, the computer 14 may comprise a personal computer (PC), work station, etc. The software may comprise, inter alia, a browser for reading and displaying web pages on the screen display 16. See FIG. 17 for an exemplary computer system 90 that may comprise the computer 14. The computer display device 15 may comprise a computer monitor. The display screen 16 is adapted to display a menu presentation interface for enabling the user 12 to navigate through the linked web-page system.

The communication link 18 comprises any communication link capable of being coupled to the web site 20 and the other web sites 24. Examples of the communication link 18 include the Internet, an Intranet, etc. The web site 20 and the other web sites 24 collectively comprise the web-page system which may be navigated by the user 12. "Navigating" means sequentially linking to web pages of the web site 20 and the other web sites 24.

The web site 20 comprises, or is coupled to as shown in FIG. 1, a computer code 22 which may be linked to a web server at the web site 20. The computer code 22 includes an algorithm 23 that enables the user 12 to navigate the linked web-page system (i.e., to sequentially link to web pages of the web site 20 and the other web sites 24 in accordance with a hierarchical menu structure of the present invention. The web site also contains memory to store the computer code 22 or other data, a processor to execute the computer code 22, peripheral input/output devices, etc. See FIG. 17 for an exemplary computer system 90 that may comprise the web site 20 or any of the other web sites 24.

Figure 12:
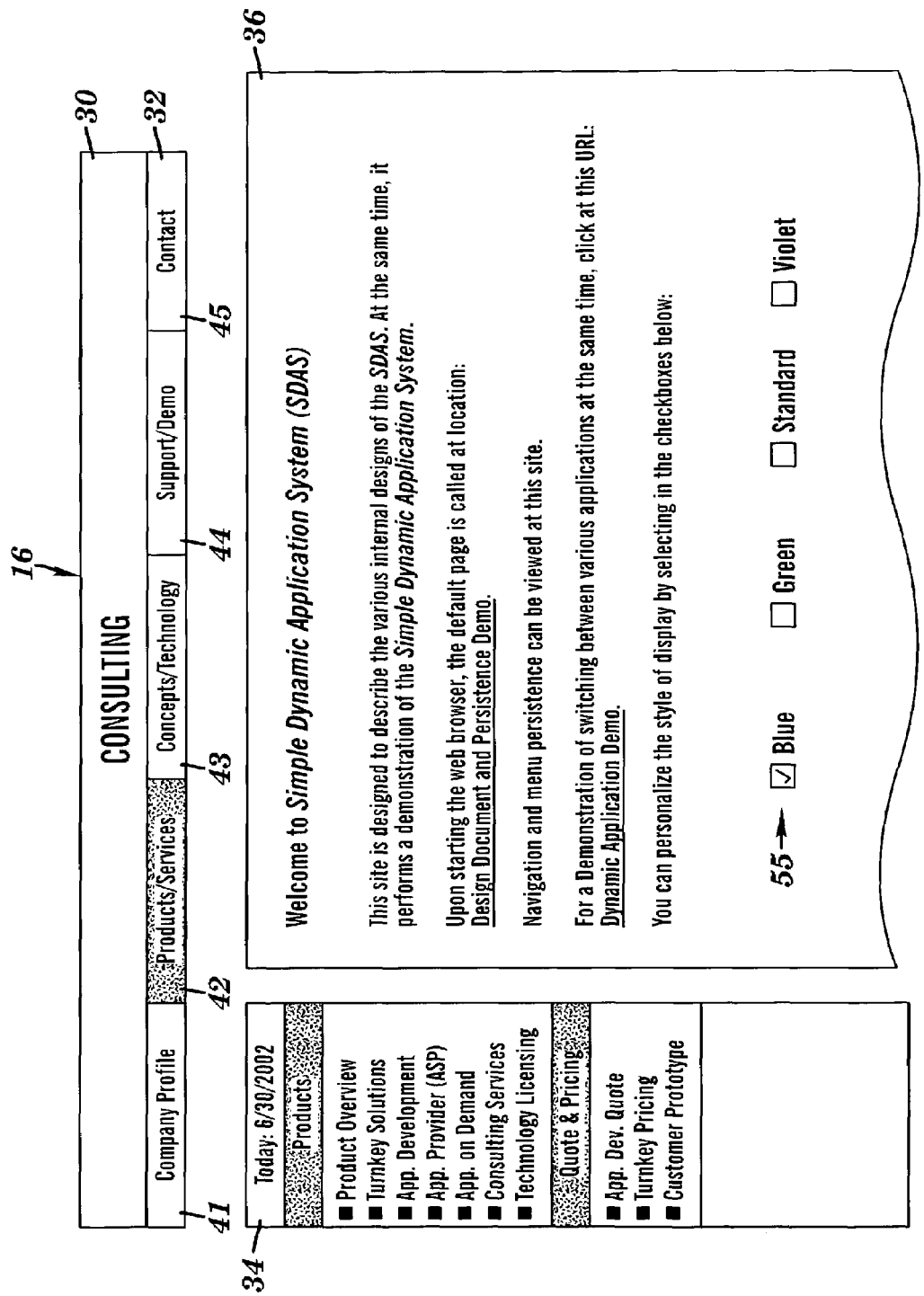
FIG. 12 depicts the display screen of FIG. 2 with the sub-level area filled with sub-level categories and associated menu items, relating to default selection of the default "Products/Services" top-level category, in accordance with embodiments of the present invention.
Figure 13:
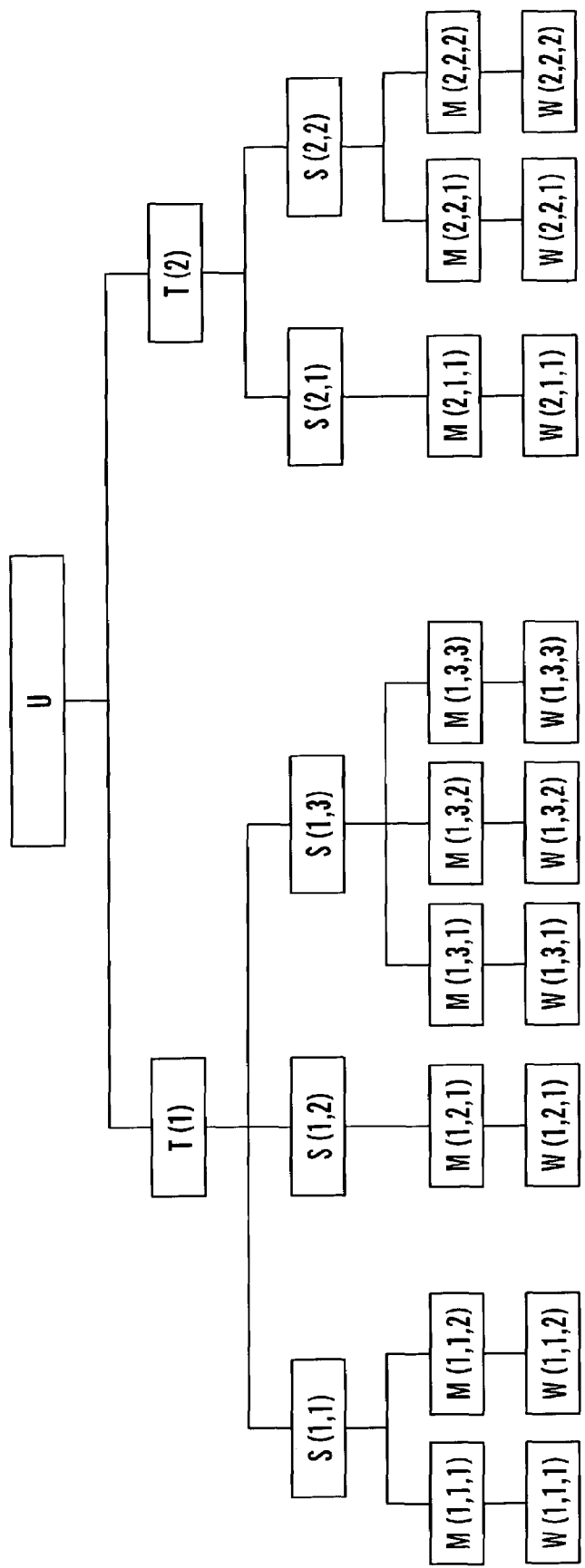
FIG. 13 depicts an embodiment that illustrates a generalized representation of the hierarchical menu structure of the present invention, in accordance with embodiments of the present invention.
Figure 14:
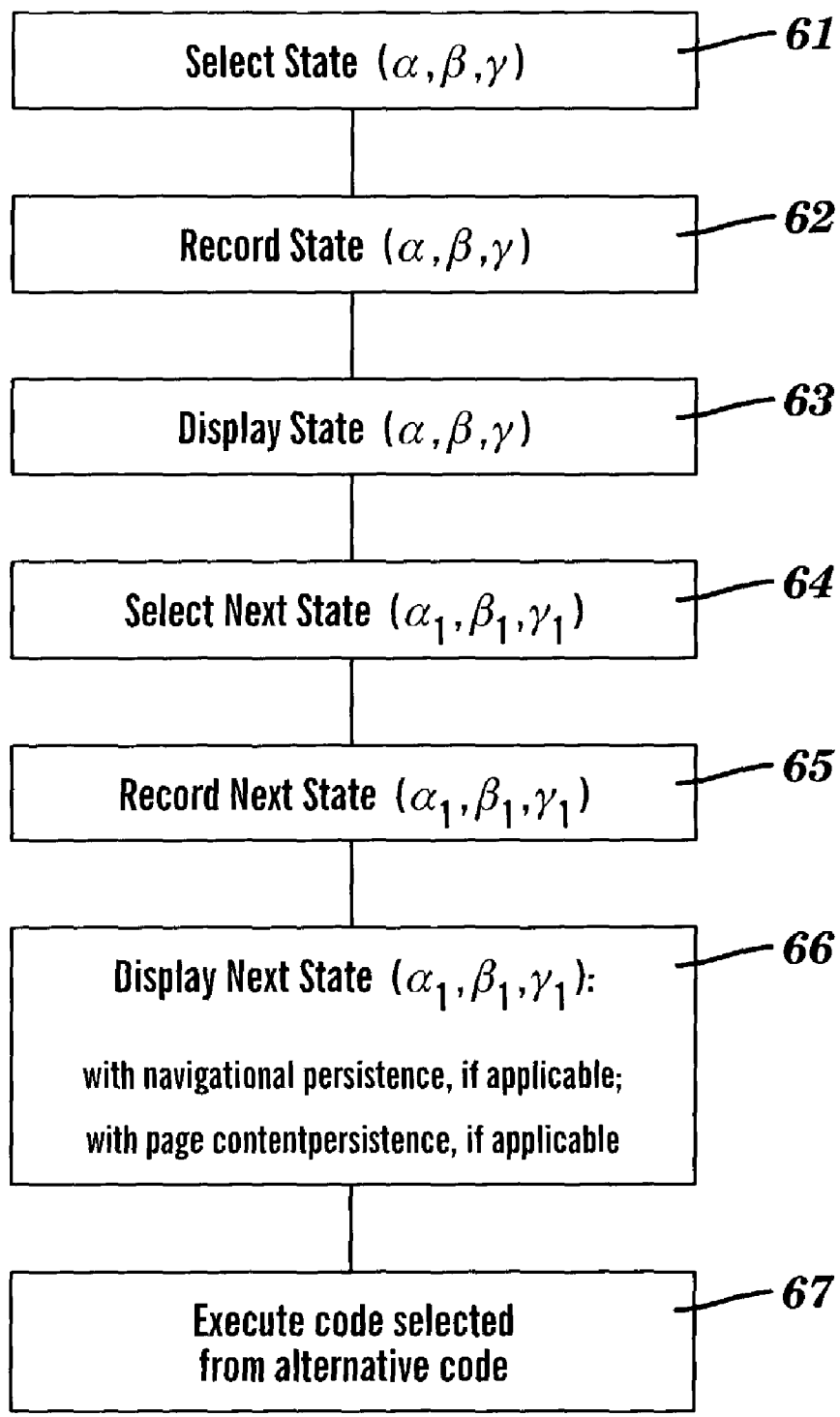
FIG. 14 is a flow chart depicting navigating through navigational states of a hierarchical menu structure, in accordance with embodiments of the present invention.

The present invention utilizes a hierarchical menu structure that is illustrated and described infra. The hierarchical menu structure comprises an uppermost top-level, a plurality of top-level categories under the uppermost top-level, one or more sub-level categories wider each top-level category, and one or more menu items held by each sub-level category. The uppermost top-level is a holder for the top-level categories and may also link to a web page. Each top-level category is a holder for its associated sub-level categories and may link to a web page. Each menu item may link to a web page. The link to the web page (from any or all of the uppermost top-level, a top-level category, and menu item) may be via a Universal Resource Locator (URL). For example, a menu item may be linked to a web page by a URL. FIGS. 2-11 depict embodiments of the hierarchical menu structure of the present invention. In particular, FIGS. 2-11 depict sequential menu selections by the user 12 in the sequential order of FIG. 2, FIG. 3, . . . , FIG. 11. FIG. 12 illustrates alternative content in the sub-level area and the web-page area of the display screen 16. FIG. 13 depicts a generalized representation of the hierarchical menu structure of the present invention. FIG. 14 is a flow chart depicting navigating through navigational states of the hierarchical menu structure.

Figure 2:
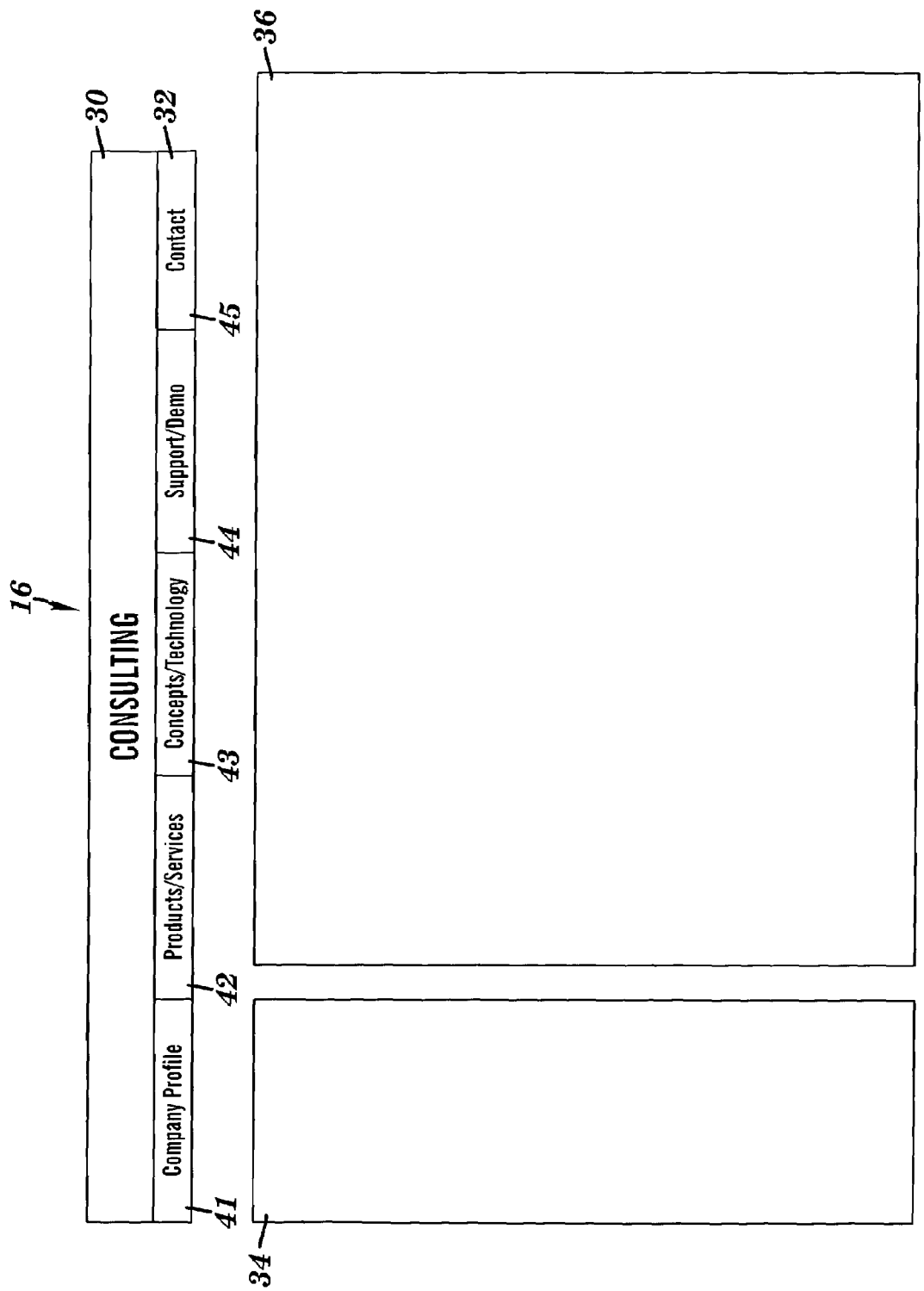
FIG. 2 depicts the display screen of FIG. 1 showing an uppermost top-level area, a top-level area filled with top-level categories, a sub-level area, and a web-page area, in accordance with embodiments of the present invention.

FIG. 2 depicts the display screen 16 that is comprised by the computer display device 15 of FIG. 1. In accordance with the hierarchical menu structure, the display screen 16 in FIG. 2 comprises an uppermost top-level area 30, a top-level area 32, a sub-level area 34, and a web-page area 36, in accordance with embodiments of the present invention. The uppermost top-level area 30, the top-level area 32 may be predetermined areas, wherein said predetermination of said areas may be based on a practical criteria such as, inter alia, where the display screen 16 designer considers placement of said areas to be most convenient for use by the user 12.

In FIG. 2, the uppermost top-level area 30 includes the uppermost top-level of "CONSULTING" which is a descriptor for the entire hierarchical menu structure. Generally, the uppermost top-level may broadly represent the entire linked web-page system (e.g., the totality of web sites coupled to the Internet) or may more narrowly represent an application or a plurality of related applications on an individual web site or may represent a broader application encompassing a plurality of web sites. Thus, the uppermost top-level 30 may encompasses, inter alia, all web sites of the Internet having a displayable web page. The uppermost top-level 30 may alternatively encompass fewer than all web sites of the Internet having a displayable web page. The uppermost top-level 30 may encompass a plurality of web sites of the Internet. The uppermost top-level 30 may encompasses a single web site of the Internet. The uppermost top-level 30 may or may not appear in the display screen 16 in any given embodiment of the present invention.

The uppermost top-level is divided into top-level categories and the top-level area 32 includes said top-level categories. For example, the top-level categories in FIG. 2 are: "Company Profile" 41, "Products/Services" 42, "Concepts/Technology" 43, "Support/Demo" 44, and "Contact" 45. When the user 12 (see FIG. 1) "selects" a top-level category, the sub-level area 34 will be subsequently filled with sub-level categories and associated menu items as will be discussed infra. "Selecting" a top-level category, or selecting anything else in the display screen 16, may be accomplished by any technique known to a person of ordinary skill in the art of computer software, such as, inter alia, by having the user 12 place a mouse pointer within the top-level category to be selected and then left double-clicking the mouse. The web-page area 36 will be subsequently filled with a web page linked from a menu item in the sub-level area 34 as will be discussed infra.

In FIG. 2, the sub-level area 34 is empty because no top-level category has been selected by the user 12. Alternatively, the sub-level area 34 could be filled with a default top-level category or with any other content. Similarly in FIG. 2, the web-page area 36 is empty because no menu item has been selected by the user 12. Alternatively, the web-page area 36 could be filled with the web page pointed to from a default menu item under the sub-level category of the default top-level pointer, or the web-page area 36 could be filled with any other content. The discussion infra of FIG. 12 illustrates the possibilities for filling the sub-level area 34 and the web-page area 36 when the user 12 has not selected content for filling the sub-level area 34 and the web-page area 36, respectively.

Figure 3:
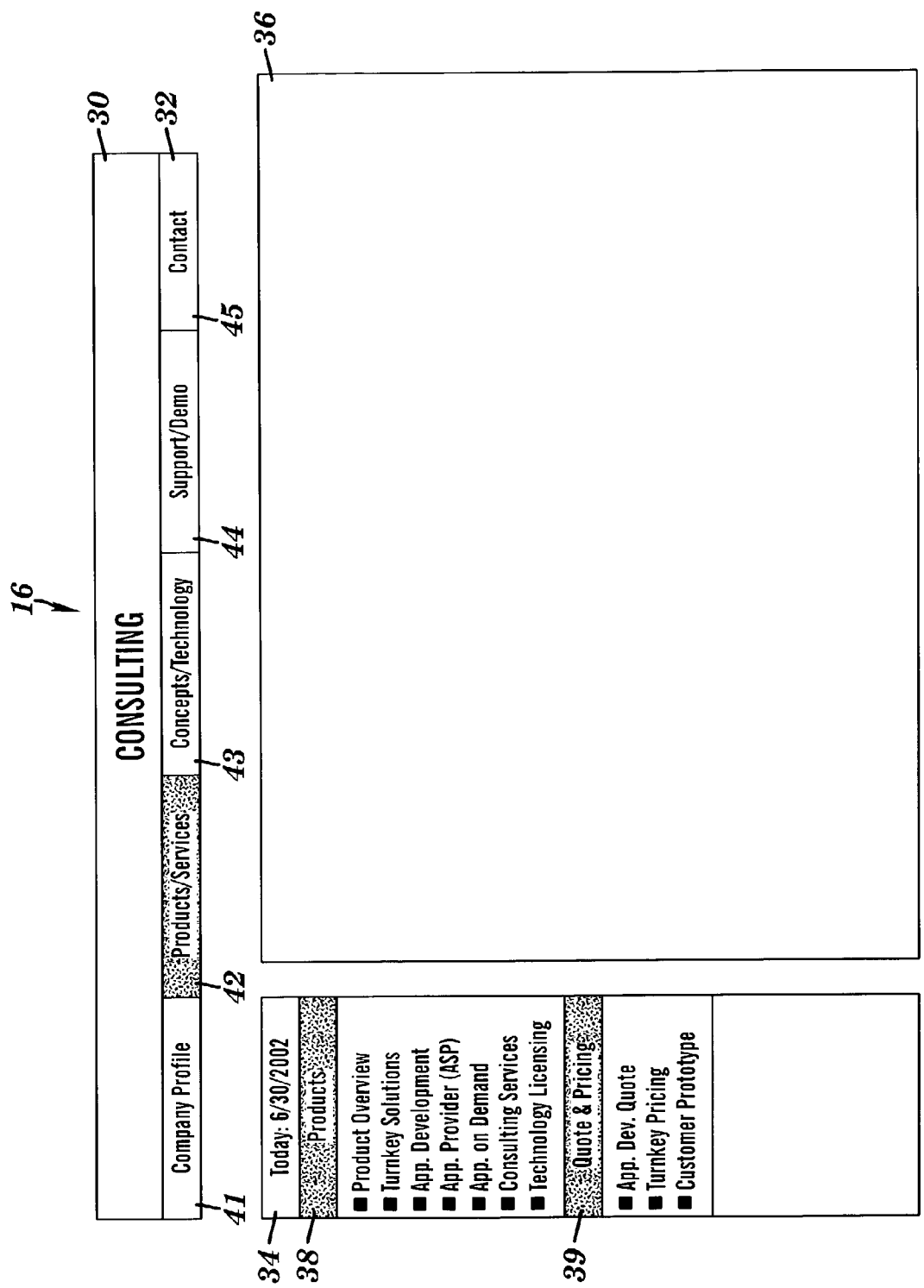
FIG. 3 depicts the display screen of FIG. 2 with the sub-level area filled with sub-level categories and associated menu items relating to selection of the "Products/Services" top-level category, in accordance with embodiments of the present invention.

FIG. 3 depicts the display screen 16 of FIG. 2 with the sub-level area 34 filled with sub-level categories and associated menu items relating to selection by the user 12 (see FIG. 1) of the "Products/Services" 42 top-level category, in accordance with embodiments of the present invention. The display screen 16 displays an identification of "Products/Services" 42 as the selected top-level category, by use of background stipling/shading to indicate the selection of "Products/Services" 42. However, the selection of "Products/Services" 42 as the top-level category may be shown in any other manner or not shown at all. In FIG. 3, the sub-level area 34 contains the sub-level categories of the "Products/Services" 42 top-level category, namely the sub-level categories of: "Products" 38 and "Quote & Pricing" 39. The sub-level category of "Products" 38 is a holder for the menu items of "Product Overview", "Turn key Solutions", "App. Development", "App. Provider (ASP)", "Consulting Services", and "Technology Licensing". The sub-level category of "Quote & Pricing" 39 is a holder for the menu items of "App Dev. Quote", "Turnkey Pricing", and "Customer Prototype".

Figure 4:
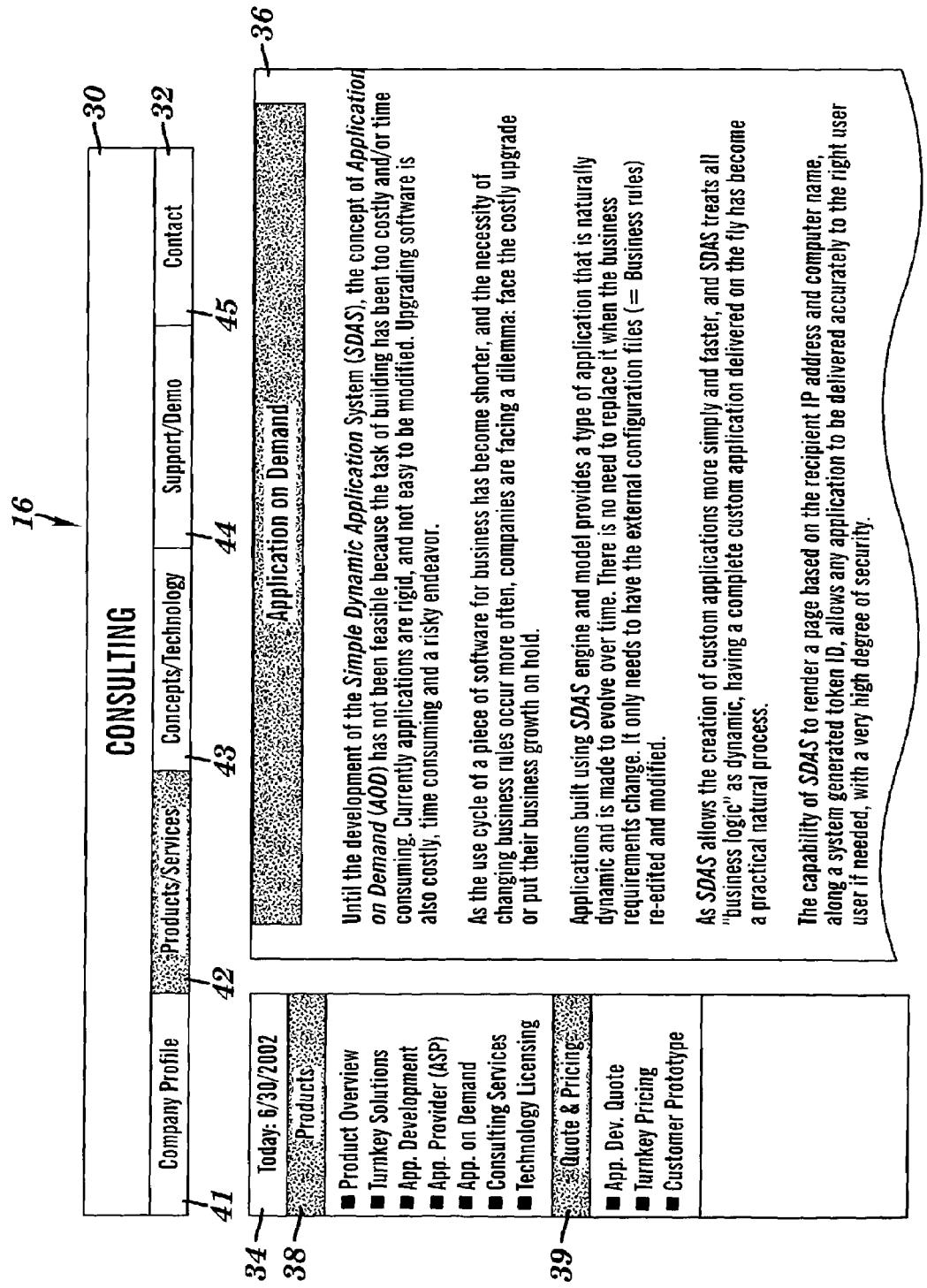
FIG. 4 depicts the display screen of FIG. 3 with the web-page area filled with a web page linked from the "App on Demand" menu item, in accordance with embodiments of the present invention.

FIG. 4 depicts the display screen 16 of FIG. 3 with the web-page area 36 filled with a web page linked from the "App on Demand" menu item relating to selection by the user 12 (see FIG. 1) of the "App on Demand" menu item, in accordance with embodiments of the present invention. The display screen 16 displays an identification of "App on Demand" as the selected menu item, by appearance of "Application on Demand" as the header in the web-page area 36. However, the selection of "App on Demand" as the menu item may be shown in any other manner or not shown at all. The text appearing in the web-page area 36 below the header "Application on Demand" is the web page linked to from the "App on Demand" menu item. Linking to the web page associated with the "App on Demand" menu item may be accomplished through use of a URL associated with the web page. Generally, the web page appearing in the web-page area 36 may be derived from the web site 20 or from the other web sites 24.

Figure 5:
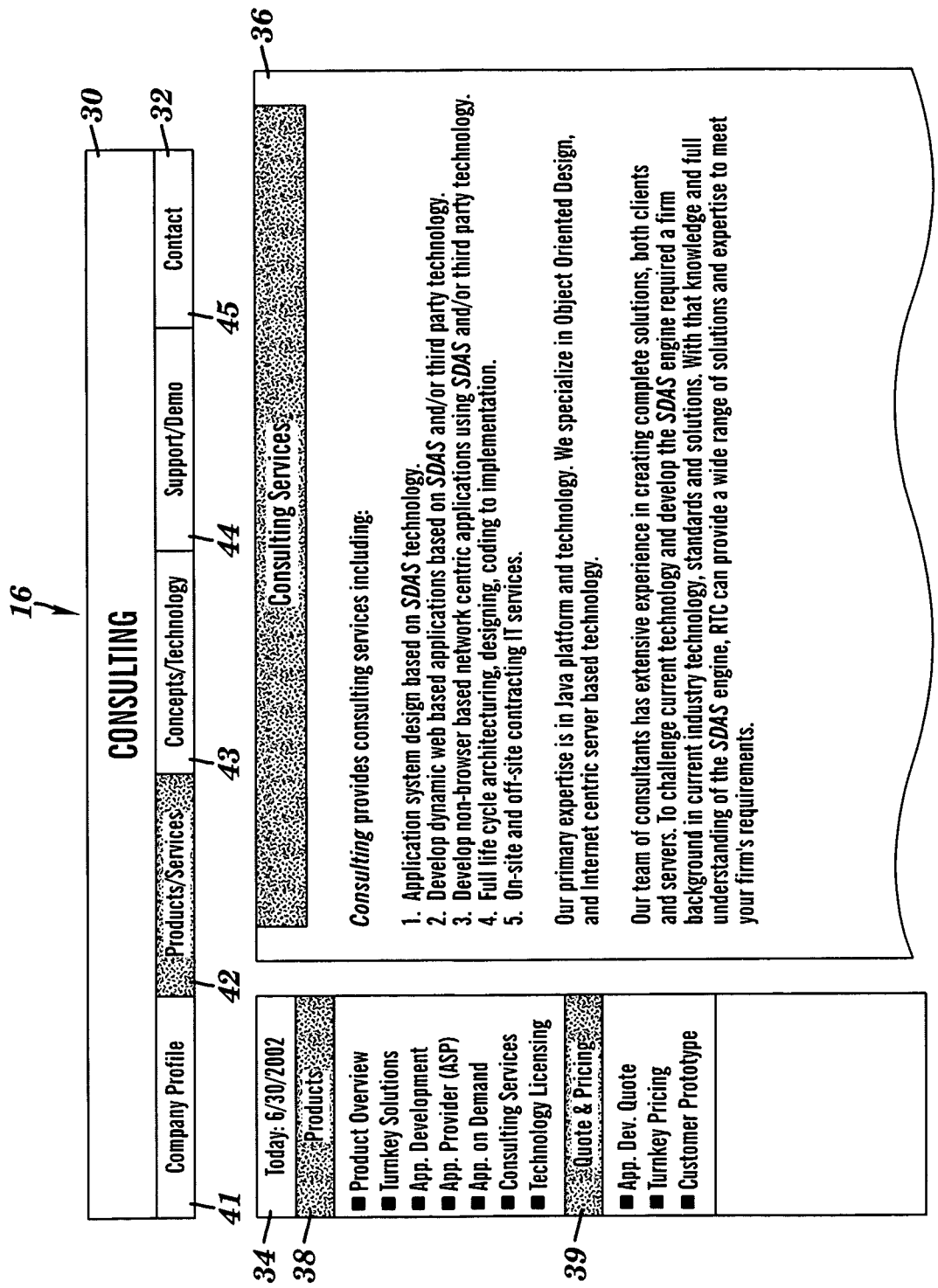
FIG. 5 depicts the display screen of FIG. 4 with the web-page area filled with a web page linked from the "Consulting Services" menu item, in accordance with embodiments of the present invention.

FIG. 5 depicts the display screen 16 of FIG. 4 with the web-page area 36 filled with a web page linked from the "Consulting Services" menu item relating to selection by the user 12 (see FIG. 1) of the "Consulting Services" menu item, in accordance with embodiments of the present invention. Selection of the "Consulting Services" menu item is indicated by the "Consulting Services" header in the web-page area 36.

Figure 6:
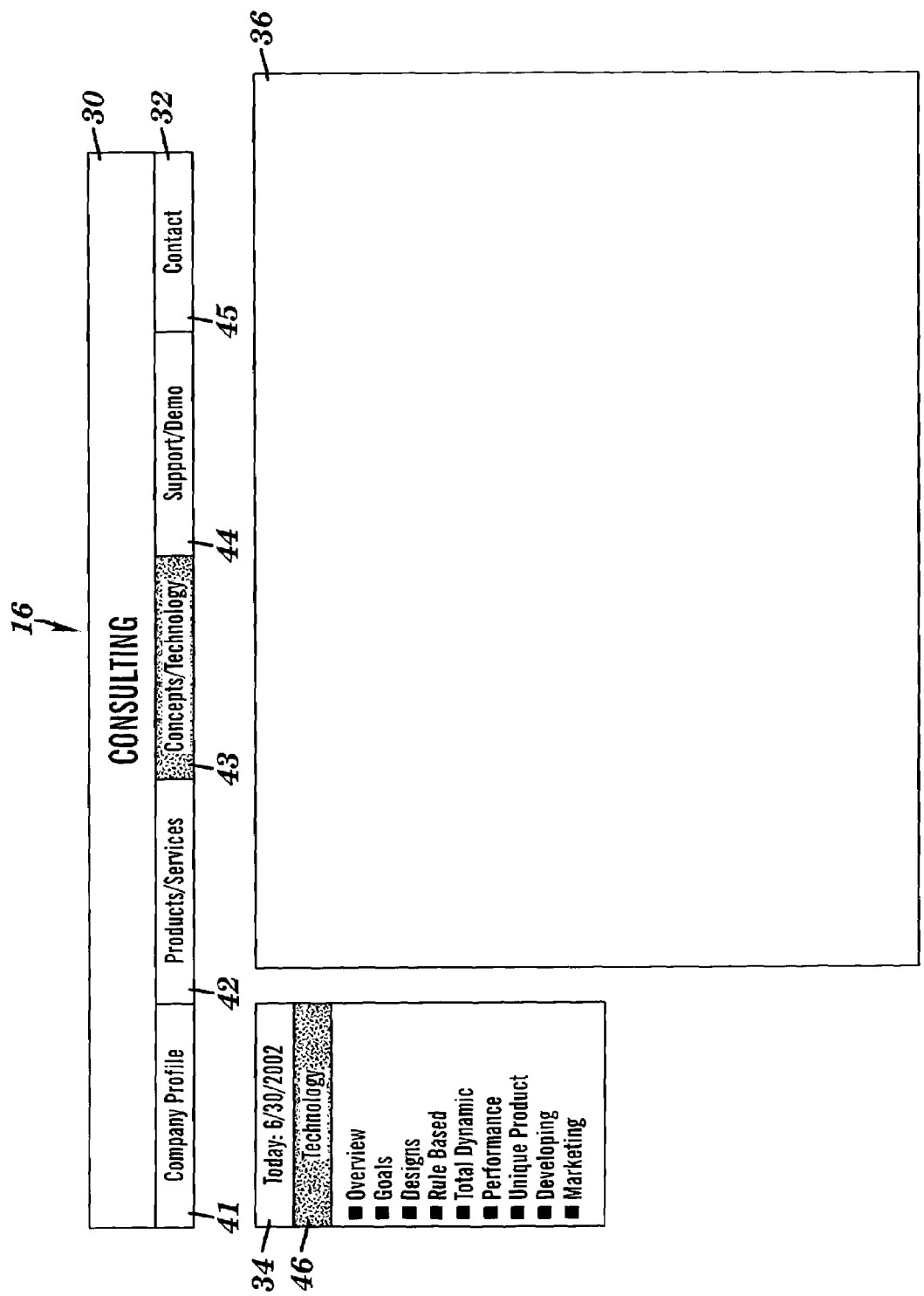
FIG. 6 depicts the display screen of FIG. 5 with the sub-level area filled with sub-level categories and associated menu items relating to selection of the "Concepts/Technology" top-level category, and with the contents of the web-page area deleted, in accordance with embodiments of the present invention.

FIG. 6 depicts the display screen 16 of FIG. 5 with the sub-level area 34 filled with sub-level category of "Technology" 46 and associated menu items relating to selection by the user 12 (see FIG. 1) of the "Concepts/Technology" 43 top-level category, and with the contents of the web-page area 36 deleted, in accordance with embodiments of the present invention. The web-page area 36 is empty because no menu item has been selected by the user 12. Alternatively, the web-page area 36 could be filled with the web page pointed to from a default menu item appearing in the sub-level area 34, or the web-page area 36 could be filled with any other content.

Figure 7:
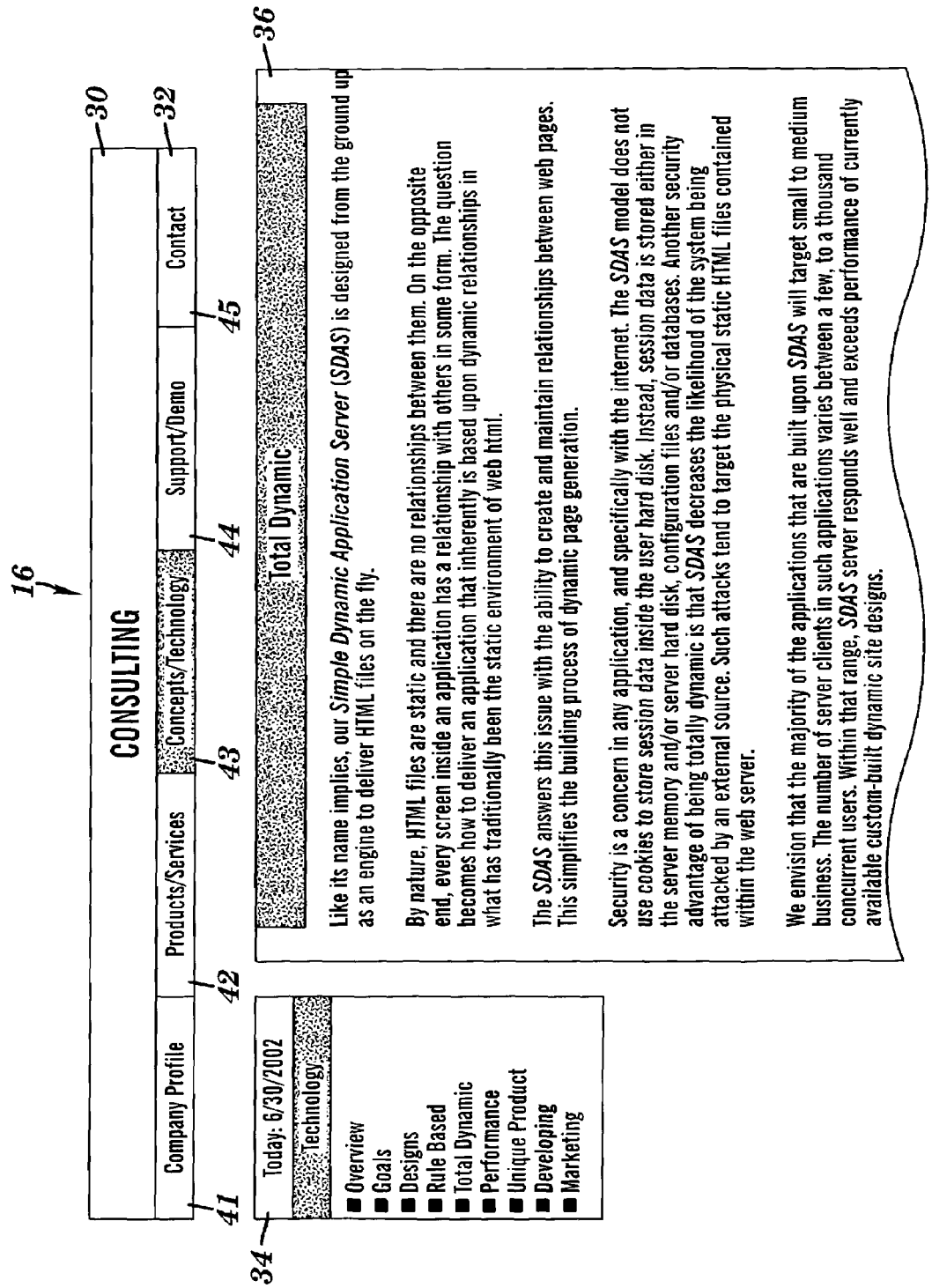
FIG. 7 depicts the display screen of FIG. 6 with the web-page area filled with a web page linked from the "Total Dynamic" menu item, in accordance with embodiments of the present invention.

FIG. 7 depicts the display screen 16 of FIG. 6 with the web-page area 36 filled with a web page linked from the "Total Dynamic" menu item relating to selection by the user 12 (see FIG. 1) of the "Total Dynamic" menu item, in accordance with embodiments of the present invention. Selection of the "Total Dynamic" menu item is indicated by the "Total Dynamic" header in the web-page area 36.

Figure 8:
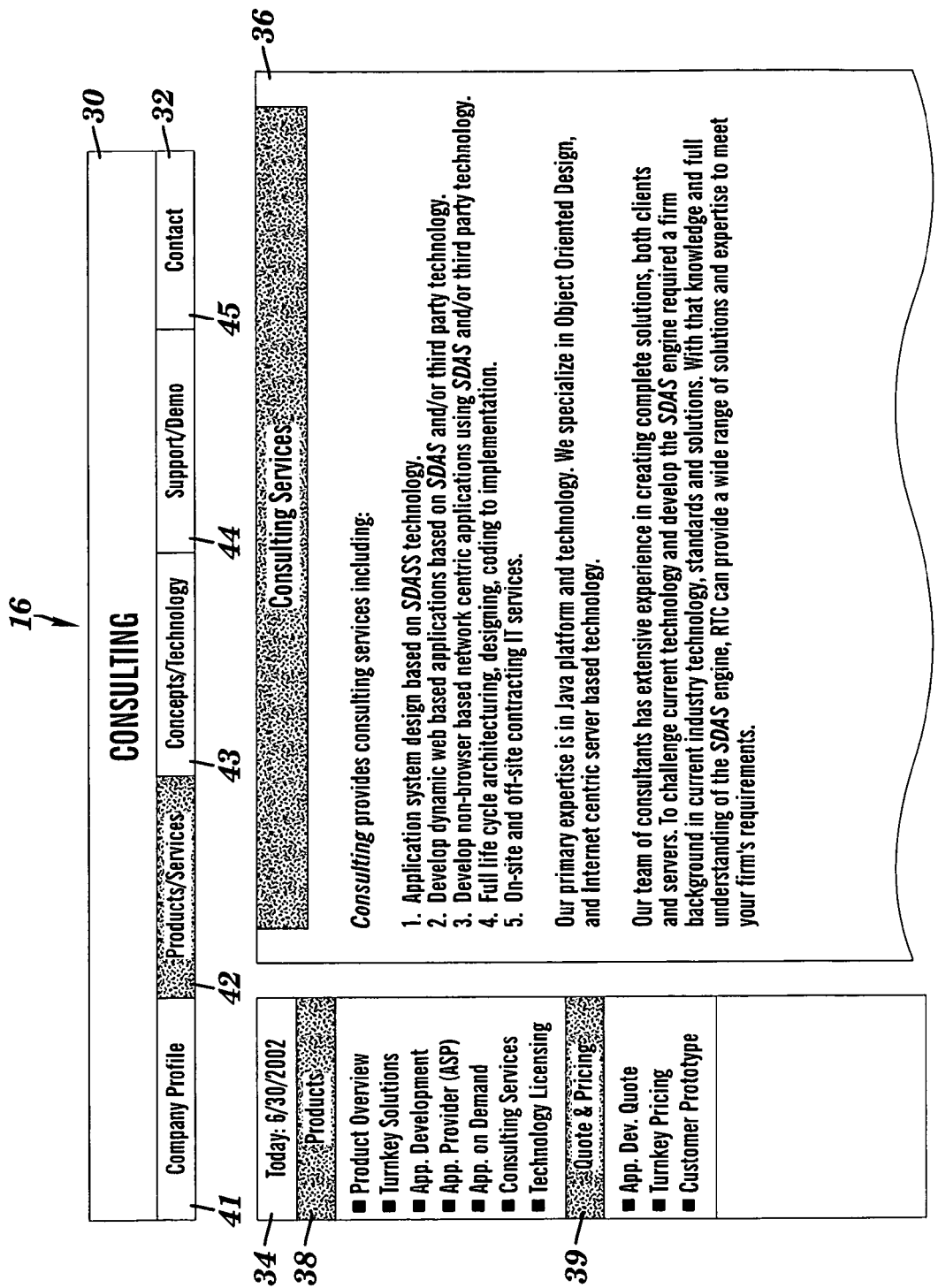
FIG. 8 depicts the display screen of FIG. 7 with the sub-level area filled with sub-level categories and associated menu items relating to selection of the "Products/Services" top-level category, and the web-page area filled with the web page pointed to by the "Consulting Services" menu item, in accordance with the navigational persistence feature of the present invention.

FIG. 8 depicts the display screen 16 of FIG. 7 with the sub-level area 34 filled with sub-level categories and associated menu items relating to selection of the "Products/Services" 42 top-level category, and the web-page area 36 area is filled with the web page pointed to by the "Consulting Services" menu item, in accordance with the "navigational persistence" feature of the present invention. "Navigational persistence" means that if the user 12 (see FIG. 1) currently selects a new top-level category (i.e., a next selected top-level category) that differs from the present top-level category in the display screen 16, then the web page pointed to by the last menu item to have been previously selected under the next top-level category is next placed in the web-page area 36. FIG. 8 illustrates navigational persistence, because the "Consulting Services" menu item (which points to the web page in the web-page area 36 of FIG. 8) is the last menu item to have been previously selected under the "Products/Services" 42 top-level category as shown in FIG. 5.

Navigational persistence may be implemented by the algorithm 23 of the computer code 22 if the algorithm 23 is adapted to record (i.e., store) a sequence of navigational states linked to by the user 12 (see FIG. 1) and if the algorithm 23 is also adapted to record the web pages pointed to by the menu items of the recorded navigational states. The recorded navigational states and the recorded web pages may be stored on a computer-readable medium (e.g., a memory or storage device). A navigational state is defined by a unique combination of top-level category, sub-level category, and menu item. Implementation of navigational persistence is conditional in dependence on the prior navigational history of the user 12 (i.e., the sequence of navigational states selected by the user 12). For example, if the next selected "Products/Services" 42 top-level category had not been previously selected or if no menu item under "Products/Services" had been previously selected (which may be ascertained from an analysis of the recorded navigational states), then navigational persistence would be inapplicable. Thus the algorithm 23 is adapted to execute code selected from alternative code (i.e., to implement navigational persistence or not to implement navigational persistence) in dependence on the recorded sequence of navigational states. Thus the present invention discloses execution by the algorithm 23 of code selected from a plurality of alternative code in dependence on the recorded sequence of navigational states. Generally, the present invention discloses that the algorithm 23 is adapted to: record a sequence of navigational links selected by the user 12 in a computer-readable medium, wherein each navigational link is a link to a web page of the linked web-page system; and execute code selected from a plurality of alternative code in dependence on the recorded sequence.

FIG. 9 depicts the display screen 16 of FIG. 8 with the sub-level area 34 filled with the sub-level categories of "Examples" 47, "Style" 48, "Support" 49, and "Technology" 50, and associated menu items, relating to selection of the "Support/Demo" 44 top-level category and with the web-page area 36 containing a web page linked from selected "Invoice System" menu item with data fields (e.g., "Name/Company") unfilled, in accordance with embodiments of the present invention. The user 12 had selected the "Invoice System" menu item from the sub-level area 34. The algorithm 23 has inserted the current date "Jun. 30, 2002" into the "Inv Date" and "Ordered" data fields.

FIG. 10 depicts the display screen 16 of FIG. 9 showing the web-page area 36 filled with "Import Customer" data content following selection of the "Imp Customer" button 52 in FIG. 9, in accordance with embodiments of the present invention. In FIG. 10, the user 12 (see FIG. 1) selects the Set 53 button for customer "Matt Dolson", which has the effect of selecting customer Matt Dolson's data (name, address, phone, etc.) for insertion into data fields of the "Invoice System" web page shown in FIG. 9. In FIG. 10, the content of the web-page area 36 is derived from an external source such as, inter alia, a database, file, table, another web site, etc.

FIG. 11 depicts the display screen of FIG. 9 wherein the "Invoice System" web page in the web-page area 36 has data fields (namely "Name/Company", "Address", "City/State/Zip", "Phone", "Contact") filled with data derived from the "Import Customer" web page of FIG. 10, in accordance with the "page content persistence" feature of the present invention. The "page content persistence" feature pertains only to dynamic web pages and not to static web pages. Static web pages are created in advance in static web sites and then are posted to a web server. Changing the content of a static page requires recreating the static pages with the changed content and then uploading the changed static page to the same server thereby replacing the previous version of the static page. Static web sites rely upon HTML pages which are considered "stateless", being that there is no linking relationship between one link and another link. Dynamic web sites contain primarily dynamic pages, and may also incorporate static pages. The dynamic pages are not created in advance, but rather are generated "on-the-fly" and not assembled as such until delivery to the recipient. Dynamic page content is created using a form template (e.g., as shown in the web-page area of FIG. 9) and filled with data (e.g., as shown in the web-page area 36 in FIG. 10) retrieved from an external source such as, inter alia, a database, file, table, another web site, etc.

"Page content persistence" means that if a dynamic web page (e.g., the web page shown in the web-page area 36 of FIG. 11) is generated, and if another top-level category or menu item is subsequently selected so as to change the content in the web-page area 36 followed subsequently by again selecting the menu item that points to the dynamic web page (e.g., the "Invoice System" menu item in the present example), then the dynamic web page with the filled data fields will be inserted into the web-page area 36. For the present example, the display screen 16 shown in FIG. 11 will persistently appear and reappear whenever the "Invoice System" menu item is selected, until the user 12 changes the content of the data fields such as by, inter alia, importing data from another customer into the web-page template shown in FIG. 9. As with "navigational persistence", implementation of page content persistence is conditional in dependence on the prior navigational history of the user 12 (i.e., the sequence of navigational states selected by the user 12), since page content persistence is inapplicable if the web-page template shown in FIG. 9 has been displayed but its data fields have not been filled in by data derived from the external source.

Generally, the algorithm 23 may implement content page persistence. Accordingly, the algorithm 23 may be adapted to: record a sequence of navigational links selected by the user; record the web pages to which the navigational links are linked; and in response to a subsequent selection of a first navigational link to a dynamic web page such that the first navigational link is one of the previously selected navigational links, display the dynamic web page in accordance with page content persistence.

As illustrated supra in FIG. 2, the sub-level area 34 may be displayed in the display screen 16 unfilled (i.e., devoid of content) if the user 12 has not selected a top-level category that dictates the sub-level categories (and associated menu items) that are to fill the sub-level area 34. Under the preceding circumstances in which the sub-level area 34 may be otherwise unfilled, the present invention permits the sub-level area 34 to be filled in accordance with a default top-level category or with any other content. For example, FIG. 12 depicts the display screen 16 of FIG. 2 with the sub-level area 34 filled with sub-level categories and associated menu items, relating to default selection of the default "Products/Services" 42 top-level category.

Similarly as illustrated supra in FIGS. 2, 3, and 6, the web-page area 36 may be displayed in the display screen 16 unfilled if the user 12 (see FIG. 1) has not selected a menu item that dictates the web page that is to fill the web-page area 36. Under the preceding circumstances in which the web-page area 36 may be otherwise unfilled, the present invention permits the web-page area 36 to be filled in accordance with a default menu item or with any other content. For example, FIG. 12 depicts the display screen 16 of FIG. 2 with the web-page area 36 filled with other content; i.e., introductory content relating to the uppermost top-level 30, in accordance with embodiments of the present invention.

FIG. 12 additionally shows a color selection submenu 55, which permits the user 12 (see FIG. 1) to select a color for any aspect of the display screen 16, including the uppermost top-level area 30, the top-level area 32, the sub-level area 34, the web-page area 36, portions thereof (e.g., background color, text color, graphics color), and combinations thereof. In FIG. 12, blue is a default color which the user 12 may override by selecting green, standard, or violet. In a similar fashion, the user 12 may be permitted to control other screen appearance attributes (e.g., text font style, text font size, etc.) in the same portion of the display screen 16 described supra for control of color, or in any other otherwise unused portion of the display screen 16.

The algorithm 23 is a vehicle through which screen appearance attributes (e.g., colors of portions of the display screen 16 as discussed supra, text font style, text font size, etc.). Thus, the algorithm 23 may be adapted to change color in an area of the display screen 16 to a new color in response to selection by the user 12 of the new color, wherein the area is selected from the group consisting of the top-level area 32, the sub-level area 34, the web-page area 36, and combinations thereof. The algorithm 23 may be adapted to change font style of text in an area of the display screen 16 to a new font style in response to selection by the user 12 of the new font style, wherein the area is selected from the group consisting of the top-level area 32, the sub-level area 34, the web-page area 36, and combinations thereof. The algorithm 23 may be adapted to change font size of text in an area of the display screen 16 to a new font size in response to selection by the user 12 of the new font size, wherein the area is selected from the group consisting of the top-level area 32, the sub-level area 34, the web-page area 36, and combinations thereof.

The hierarchical menu structure of the present invention is formulated in a generalized representation, as illustrated by FIG. 12 in accordance with embodiments of the present invention. The hierarchical menu structure enables a user of a linked web-page system to navigate through the linked web-page system. The hierarchical menu structure comprises an uppermost top-level (U) and I top-level categories denoted as T(1), T(2), ... T(I), wherein I≧2. The uppermost top-level is divided into the I top-level categories. The hierarchical menu structure also includes $J_1$ sub-level categories associated with top-level category T(i), wherein $J_i$ is a function of i, wherein $J_1 \geq 1$, and wherein the $J_1$ sub-level categories are denoted as S(i,1), S(i,2), ..., S(i,$J_i$), for i=1, 2, ..., I. The hierarchical menu structure additionally includes $K_{ij}$ menu items held by sub-level category S(i,j), wherein $K_{1j}$ is a function of i and j, wherein $K_{1j} \geq 1$, wherein the $K_{ij}$ menu items are denoted as M(i,j,1), M(i,j,2), ..., M(i,j,$K_{1j}$), and wherein the menu item M(i,j,k) is linked to a web page W(i,j,k), for i=1, 2, ..., I and j=1, 2, ..., $J_i$ and k=1, 2, ..., $K_{ij}$. The index set (i,j,k) identifies a navigational state of the hierarchical menu structure, wherein i points to the top-level category T(i), j points to the sub-level category S(i,j) under T(i), and k points to the menu item M(i,j,k) under S(i,j).

FIG. 13 illustrates the preceding notation in which the generalized representation of the hierarchical menu structure of the present invention is formulated. In FIG. 13, U denotes the uppermost top-level, and I=2 since there are 2 top-level categories, namely T(1) and T(2). $J_1$=3 in relation to the 3 sub-level categories S(1,1), S(1,2), and S(1,3). $J_2$=2 in relation to the 2 sub-level categories S(2,1) and S(2,2). $K_{11}$=2 in relation to the 2 menu items M(1,1,1) and M(1,1,2). $K_{12}$=1 in relation to the 1 menu item M(1,2,1). $K_{13}$=3 in relation to the 3 menu items M(1,3,1), M(1,3,2), and M(1,3,3). $K_{21}$=1 in relation to the 1 menu item M(2,1,1). $K_{22}$=2 in relation to the 2 menu items M(2,2,1) and M(2,2,2). The menu items M(1,1,1), M(1,1,2), M(1,2,1), M(1,3,1), M(1,3,2), M(1,3,3), M(2,1,1), M(2,2,1), and M(2,2,2) respectively point to the web pages W(1,1,1), W(1,1,2), W(1,2,1), W(1,3,1), W(1,3,2), W(1,3,3), W(2,1,1), W(2,2,1), and W(2,2,2).

The display screen 16 (See FIG. 1) comprises a display, generated by the algorithm 23, of the following quantities appearing between the curly brackets { }, wherein $\alpha$, $\beta$, and $\gamma$ are dummy indices:

{
U,
(T(1), T(2), ..., T(I)),
(S($\alpha,\beta$), (M($\alpha,\beta,\gamma$), $\gamma$=1, 2, ..., $K_{\alpha\beta}$), $\beta$=1, 2, ..., $J_\alpha$), and
W($\alpha,\beta,\gamma$),
wherein $\alpha$ is one of 1, 2, ..., and I,
wherein $\beta$ is one of 1, 2, ..., and $J_\alpha$, and
wherein $\gamma$ is one of 1, 2, ..., and $K_{\alpha\beta}$,
}.

In the display screen 16 of FIG. 2, the uppermost top-level area 30 comprises U. The top-level area 32 comprises (T(1), T(2), ..., T(I)). The sub-level area 34 comprises (S($\alpha,\beta$), (M($\alpha,\beta,\gamma$), $\gamma$=1, 2, ..., $K_{\alpha\beta}$), $\beta$=1, 2, ..., $J_\alpha$). The web-page area 36 comprises W($\alpha,\beta,\gamma$). The index set ($\alpha,\beta,\gamma$) identifies the navigational state being displayed, wherein $\alpha$ points to the top-level category T($\alpha$), $\beta$ points to the sub-level category S($\alpha,\beta$) under T($\alpha$), and $\gamma$ points to the menu item M($\alpha,\beta,\gamma$) under S($\alpha,\beta$).

If the user selects a navigational state ($\alpha_1,\beta_1,\gamma_1$) to replace the navigational state ($\alpha,\beta,\gamma$) such that W($\alpha_1,\beta_1,\gamma_1$) differs from W($\alpha,\beta,\gamma$), then the algorithm 23 is adapted to refresh the sub-level area 34 with a display of (S($\alpha_1,\beta_1$), (M($\alpha_1,\beta_1,\gamma_1$), $\gamma_1$=1, 2, ..., $K_{\alpha1,\beta1}$), $\beta_1$=1, 2, ..., $J_{\alpha1}$) and to refresh the web-page area 36 with W($\alpha_1,\beta_1,\gamma_1$).

If the user sequentially selects N unique navigational states in a sequence of ($\alpha_1,\beta_1,\gamma_1$), ($\alpha_2,\beta_2,\gamma_2$), ..., ($\alpha_N,\beta_N,\gamma_N$) such that N≧2, then the algorithm 23 is adapted to refresh the web-page area 36 with W($\alpha_n,\beta_n,\gamma_n$) following selection of the navigational state ($\alpha_n,\beta_n,\gamma_n$) for n=1, 2, ..., N. The algorithm 23 is further adapted to record (i.e., store) said sequence of navigational states and have access to said recorded sequence following the recording of said sequence. Following the recording of said sequence the algorithm 23 is further adapted to execute code selected from a plurality of alternative code in dependence on said recorded sequence.

If the user sequentially selects N unique navigational states in a sequence of ($\alpha_1,\beta_1,\gamma_1$), ($\alpha_2,\beta_2,\gamma_2$), ..., ($\alpha_N,\beta_N,\gamma_N$) such that N≧2, then the algorithm 23 is adapted to record said sequence of navigational states and have access to said recorded sequence following the recording of said sequence. Following the recording of said sequence the algorithm 23 is further adapted to execute code selected from a plurality of alternative code in dependence on said recorded sequence.

If the user selects a next top-level category $\alpha_1$ such that $\alpha_1$ differs from a but does not select a next menu item, then the algorithm 23 is adapted to: select a web page $W(\alpha_1,\_,\_)$ in accordance with navigational persistence; and refresh the web-page area 36 with the web page $W(\alpha_1,\_,\_)$. The algorithm 23 is also adapted to refresh the web-page area 36 with the web page $W(\alpha_1,\_,\_)$ in accordance with content page persistence. The underscore string "$\_,\_$" appearing in $W(\alpha_1,\_,\_)$ denotes that the sub-level category and menu item have not yet been selected following selection of the next top-level category $\alpha_1$. If the user selects a navigational state $(\alpha,\beta_1,\gamma_1)$ to replace the navigational state $(\alpha,\beta,\gamma)$ such that $\gamma_1$ differs from $\gamma$ then the algorithm is adapted to refresh the web-page area 36 with $W(\alpha,\beta_1,\gamma_1)$ in accordance with page content persistence if $W(\alpha,\beta_1,\gamma_1)$ is a dynamic web page.

In accordance with the preceding discussion, FIG. 14 is a flow chart depicting navigating through navigational states of the hierarchical menu structure, in accordance with embodiments of the present invention. Step 61 selects a navigational state $(\alpha,\beta,\gamma)$. Step 62 records the navigational state $(\alpha,\beta,\gamma)$. Step 63 displays the navigational state $(\alpha,\beta,\gamma)$. Step 64 selects a next navigational state $(\alpha_1,\beta_1,\gamma_1)$. Step 65 records the next navigational state $(\alpha_1,\beta_1,\gamma_1)$. Step 66 displays the next navigational state $(\alpha_1,\beta_1,\gamma_1)$: with navigational persistence if applicable (as discussed supra); and with page content persistence if applicable (as discussed supra). Step 67 executes alternative code depending on the navigational state sequence $(\alpha,\beta,\gamma)$, $(\alpha_1,\beta_1,\gamma_1)$ as discussed supra.

Figure 15:
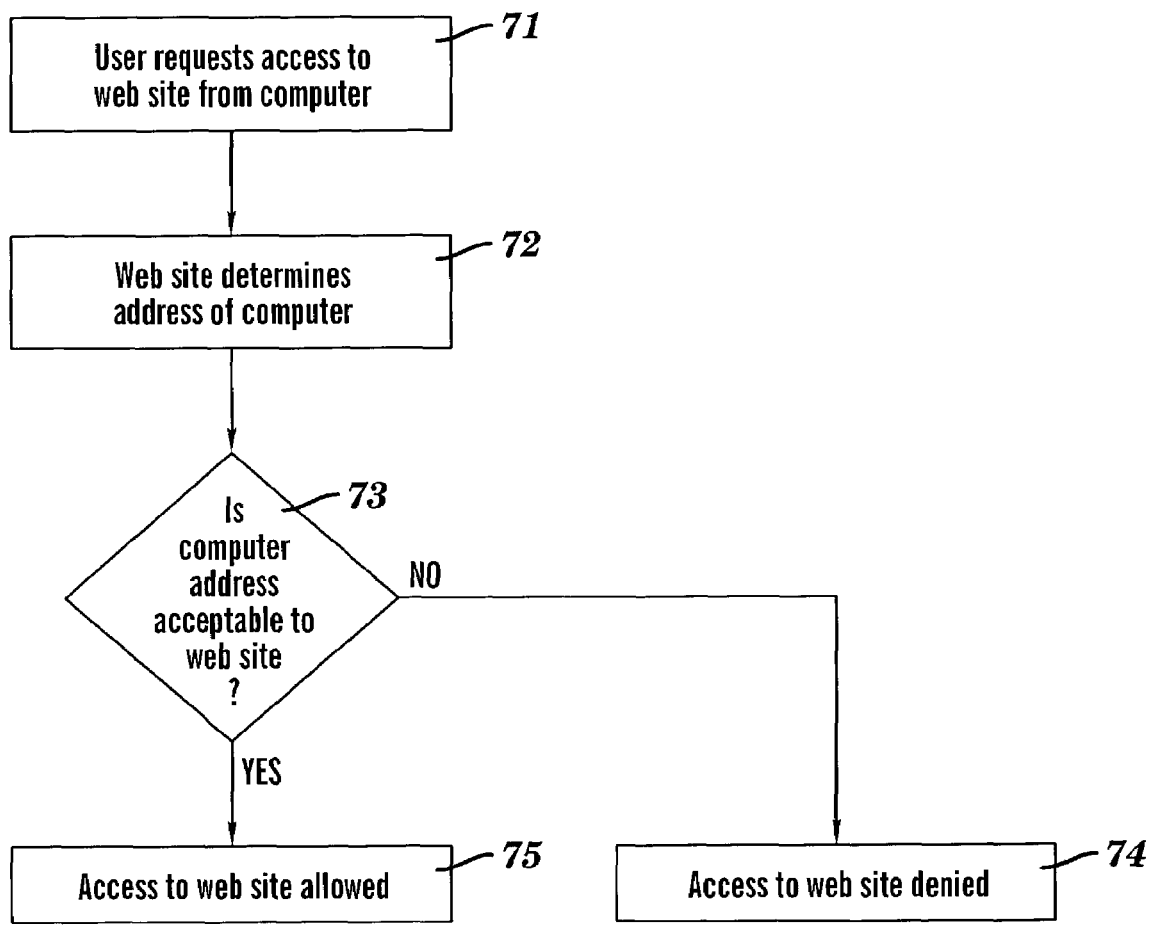
FIG. 15 is a flow chart depicting a first method for controlling access to a web site from a computer, in accordance with embodiments of the present invention.

In FIG. 1 the web site 20 may control access from the computer 14. FIG. 15 is a flow chart depicting a first method for controlling access to the web site 20 from the computer 14, in accordance with embodiments of the present invention. The first method of access control the web site 20 is based on the address of the computer 14. In step 71 of FIG. 15, the computer 14 links to the web site 20 and the user 12 then requests access to the web site 20 from the computer 14. In step 72, a web server at the web site 20 (or a computer code linked the web server such as the computer code 22 in FIG. 1) determines the address of the computer 14 by any method known to a person of ordinary skill in the art, such as by communication of the address of the computer 14 by the software (e.g., a browser) that has linked the computer 14 to the web site 20. In step 73, the web server 20 determines if the computer address so determined is acceptable to the web site 20, such as by, inter alia, querying a list of computer addresses having authorization for their associated computer to have access to the web site 20. If the computer address is not acceptable (i.e., NO) then access of the computer 14 to the web site 20 is denied as shown in step 74. If the computer address is acceptable (i.e., YES), then access of the computer 14 to the web site 20 is allowed as shown in step 75.

Figure 16:
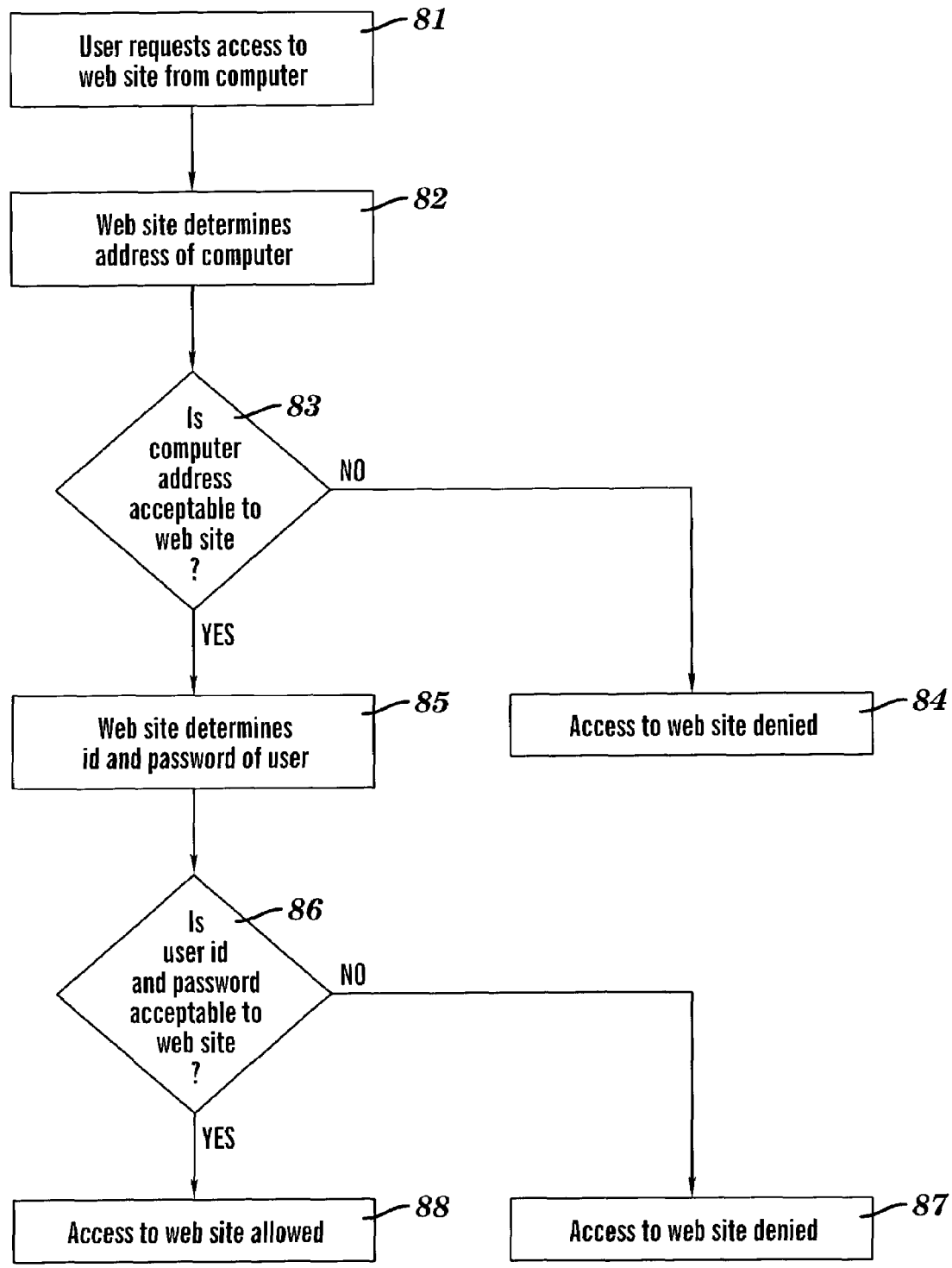
FIG. 16 is a flow chart depicting a second method for controlling access to a web site from a computer, in accordance with embodiments of the present invention.

FIG. 16 is a flow chart depicting a second method for controlling access to the web site 20 from the computer 14, in accordance with embodiments of the present invention. The second method of access control the web site 20 is based on the address of the computer 14, the user identification (ID) of the user 12, and the password provided by the user 12. Steps 81-84 in FIG. 16 are analogous to steps 71-74 in FIG. 15. In step 81 of FIG. 16, the computer 14 links to the web site 20 and the user 12 then requests access to the web site 20 from the computer 14. In step 82, a web server at the web site 20 (or a computer code linked the web server such as the computer code 22 in FIG. 1) determines the address of the computer 14 by any method known to a person of ordinary skill in the art, such as by communication of the address of the computer 14 by the software (e.g., a browser) that has linked the computer 14 to the web site 20. In step 83, the web server 20 determines if the computer address so determined is acceptable to the web site 20, such as by, inter alia, querying a list of computer addresses having authorization for their associated computer to have access to the web site 20. If the computer address is not acceptable (i.e., NO) then access of the computer 14 to the web site 20 is denied as shown in step 84. If the computer address is acceptable (i.e., YES), then step 85 is executed. In step 85, the web server determines the user ID and associated password after having requested the user 12 to supply the user ID and password. In step 86, the web server 20 determines if user ID and password are acceptable to the web site 20, such as by, inter alia, querying a list of user ID and password having authorization to have access to the web site 20. If the user ID and password are not acceptable (i.e., NO) then access of the computer 14 to the web site 20 is denied as shown in step 87. If the user ID and password are acceptable (i.e., YES), then access of the computer 14 to the web site 20 is allowed as shown in step 88.

The identity of the computer 14 (e.g., computer address of the computer 14) has been used in conjunction with the methods depicted in FIGS. 15 and 16 to control access to the web site 20. However, the identity of the computer 14 may be used for other purposes. For example, an attribute of the hierarchical menu structure, described supra, may be a function of the identity of the computer 14. Said attribute may be at least one of: the uppermost top-level, a top-level category of the top-level categories, a sub-level category of the sub-level categories, a menu item of the menu items, and the web page to which the menu item is linked. Thus, different computers linked to the same web site via the same URL may be linked to different hierarchical menu structures. As another example, a navigational link selected by the user 12 may result in the computer 14 linking to a web page that a function of the identity of the computer 14. Thus, the same navigational link selected by users of different computers may result in the different computers linking to different web pages.

Figure 17:
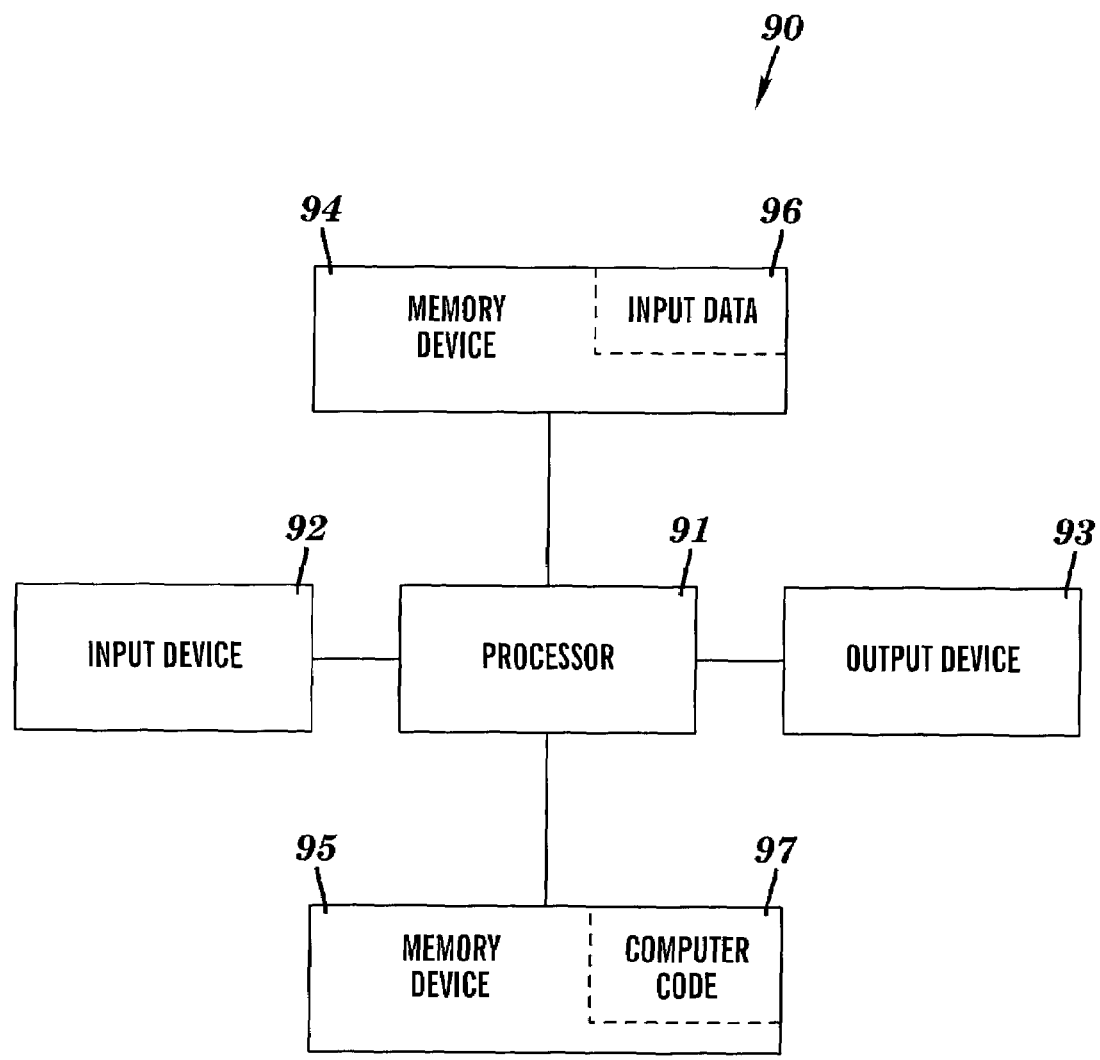
FIG. 17 illustrates an exemplary computer system, in accordance with embodiments of the present invention.

FIG. 17 illustrates an exemplary computer system 90 that may comprise the web site 20, any of the other web sites 24, or the computer 14, etc. (see FIG. 1), in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer display device (e.g, the computer display device 15 of FIG. 1 if the computer system 90 comprises the computer 14), a magnetic tape, a removable hard disk, a floppy disk, etc. The memory devices 94 and 95 may be, inter alia, a hard disk, a dynamic random access memory (DRAM), a read-only memory (ROM), etc. The memory device 95 includes a computer code 97 (e.g., the computer code 22 of FIG. 1). The computer code 97 includes an algorithm (e.g., the algorithm 23 of the computer code 22 of FIG. 1). The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 17) may be used as a computer usable medium (or a computer-readable medium or a program storage device) having a computer readable program code embodied therein and/or having other data stored therein, wherein the computer readable program code may comprise the computer code 97. Generally, a computer program product (or, alternatively, an article of manufacture) of the computer system 90 may comprise said computer usable medium (or said program storage device).

While FIG. 17 shows the computer system 90 as a particular configuration of hardware and software, any configuration of hardware and software, as would be known to a person of ordinary skill in the art, may be utilized for the purposes stated supra in conjunction with the particular computer system 90 of FIG. 17. For example, the memory devices 94 and 95 may be portions of a single memory device rather than separate memory devices.

FIGS. 1-17 and accompanying description have illustrated the hierarchical menu structure of the present invention. A feature of the present invention is that a web page may be linked to from the uppermost top-level, a top-level category, or a menu item. It should be noted, however, that such a linking to a web page may trigger a navigation through a second hierarchical menu structure whose uppermost top-level is the web page so linked to. This process may continue iteratively, so that the user 12 (see FIG. 1) may iteratively link through a sequence of hierarchical menu structures $H_1, H_2, \ldots, H_N$ ($N \geq 2$) such that the user sequentially links from menu structure $H_n$ to $H_{n+1}$ for n=1, 2, . . . , N−1. Said sequential linking through said sequence of hierarchical menu structures $H_1, H_2, \ldots, H_N$ may be accomplished in accordance with navigational persistence and page content persistence across hierarchical menu structure boundaries. For example, if the user 12 links from hierarchical menu structure $H_{n1}$ to hierarchical menu structure $H_{n2}$ (wherein $H_{n2} \neq H_{n1}$) and subsequently returns to hierarchical menu structure $H_{n1}$, then the scope of the present invention includes navigational persistence and page content persistence with respect to web pages linked to within the return to hierarchical menu structure $H_{n1}$. For the latter example, both navigational persistence and page content persistence are said to be operative across a boundary between $H_{n1}$ and $H_{n2}$.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer program product, comprising a computer usable medium having a computer readable program code embodied therein for enabling a user of a linked web-page system to navigate through the linked web-page system in accordance with a hierarchical menu structure, said hierarchical menu structure comprising:

an uppermost top-level;

I top-level categories denoted as T(1), T(2), . . . , T(I), wherein I≧2, and wherein the uppermost top-level is divided into the I top level categories;

$J_i$ sub-level categories associated with top-level category T(i), wherein $J_i$ is a function of i, wherein $J_i \geq 1$, and wherein the $J_i$ sub-level categories are denoted as S(i,1), S(i,2), . . . , S(i,$J_i$), for i=1, 2, . . . , I; and $K_{ij}$ menu items held by sub-level category S(i,j), wherein $K_{ij}$ is a function of i and j, wherein $K_{ij} \geq 1$, wherein the $K_{ij}$ menu items are denoted as M(i,j,1), M(i,j,2), . . . , M(i,j,$K_{ij}$), and wherein the menu item M(i,j,k) is linked to a web page W(i,j,k), for i=1, 2, . . . , I and j=1, 2, . . . , $J_i$ and k=1, 2, . . . , $K_{ij}$, said computer code comprising an algorithm adapted to generate, on a display screen of a computer display device, a display of a navigational state ($\alpha,\beta,\gamma$) of the hierarchical menu structure, said display comprising a simultaneous depiction of: (T(1), T(2), . . . , T(I)), (S($\alpha,\beta$), (M($\alpha,\beta,\gamma$), $\gamma$=1, 2, . . . , $K_{\alpha\beta}$), $\beta$=1, 2, . . . , $J_\alpha$), and W($\alpha, \beta,\gamma$), wherein $\alpha$ is selected from the group consisting of 1, 2, . . . , and I, wherein $\beta$ is selected from the group consisting of 1, 2, . . . , and $J_\alpha$, and wherein $\gamma$ selected from the group consisting of 1, 2, . . . , and $K_{\alpha\beta}$, wherein the display comprises a top-level area, a sub-level area, and a web-page area, wherein the top-level area comprises the depiction of (T(1), T(2), . . . , T(I)), wherein the sub-level area comprises the depiction of (S($\alpha,\beta$), (M($\alpha,\beta,\gamma$), $\gamma$=1, 2, . . . , $K_{\alpha\beta}$), $\beta$=1, 2, . . . , $J_\alpha$), wherein the web-page area comprises the depiction of W($\alpha,\beta,\gamma$), and wherein if the user selects a next top-level category $\alpha_1$ such that $\alpha_1$ differs from $\alpha$ but does not select a next menu item, then the algorithm is adapted to:

select a web page W($\alpha_1,\_,\_$) in accordance with navigational persistence, wherein the underscore string $\_,\_$ appearing in W($\alpha_1,\_,\_$) denotes that a sub-level category and menu item have not yet been selected following selection of the next top-level category $\alpha_1$; and refresh the web-page area with the web page W($\alpha_1,\_,\_$).

2. The computer program product of claim 1, wherein the algorithm is adapted to refresh the web-page area with the web page W($\alpha_1,\_,\_$) in accordance with page content persistence.

* * * * *

UNITED STATES PATENT AND TRADEMARK OFFICE
CERTIFICATE OF CORRECTION

PATENT NO. : 7,353,460 B2
APPLICATION NO. : 10/213723
DATED : April 1, 2008
INVENTOR(S) : Tu It is certified that error appears in the above-identified patent and that said Letters Patent is hereby corrected as shown below:

First Page
Under "References Cited" please add -- 6,957,390   10/2005   Tamir......... 715/744 --

Column 1
Line 59, delete "wherein I$\geqq$2," and insert -- wherein I$\geq$2, --
Line 62, delete "wherein J$_i\geqq$1," and insert -- wherein J$_i\geq$1, --
Line 66, delete "wherein K$_{ij}\geqq$1," and insert -- wherein K$_{ij}\geq$1, --

Column 2
Line 13, delete "wherein I$\geqq$2," and insert -- wherein I$\geq$2, --
Line 16, delete "wherein J$_1\geqq$1," and insert -- wherein J$_1\geq$1, --
Line 20, delete "wherein K$_{1j}\geqq$1," and insert -- wherein K$_{1j}\geq$1, --
Line 46, delete "wherein I$\geqq$2," and insert -- wherein I$\geq$2, --
Line 53, delete "wherein K$_{ij}\geqq$1," and insert -- wherein K$_{ij}\geq$1, --

Column 4
Line 19, delete "wherein I$\geqq$2," and insert -- wherein I$\geq$2, --
Line 22, delete "wherein J$_i\geqq$1," and insert -- wherein J$_i\geq$1, --
Line 27, delete "wherein K$_{1j}\geqq$1," and insert -- wherein K$_{1j}\geq$1, --

Column 11
Line 32, delete "font style," and insert -- color, --
Line 37, delete "font size," and insert -- color, --
Line 48, delete "wherein I$\geqq$2." and insert -- wherein I$\geq$2. --
Line 52, delete "wherein J$_1\geqq$1," and insert -- wherein J$_1\geq$1, --
Line 56, delete "wherein K$_{1j}\geqq$1," and insert -- wherein K$_{1j}\geq$1, --

Column 12
Line 47, delete "that N$\geqq$2," and insert -- that N$\geq$2, --
Line 59, delete "that N$\geqq$2," and insert -- that N$\geq$2, --

Column 15
Line 24, delete "(N$\geqq$2)" and insert -- (N$\geq$2) --

UNITED STATES PATENT AND TRADEMARK OFFICE
CERTIFICATE OF CORRECTION

PATENT NO.        : 7,353,460 B2
APPLICATION NO.   : 10/213723
DATED             : April 1, 2008
INVENTOR(S)       : Tu It is certified that error appears in the above-identified patent and that said Letters Patent is hereby corrected as shown below:

Column 16
Line 3, delete "wherein $I \geqq 2$," and insert -- wherein $I \geq 2$, --
Line 6, delete "wherein $J_i \geqq 1$," and insert -- wherein $J_i \geq 1$, --
Line 10, delete "wherein $K_{ij} \geqq 1$," and insert -- wherein $K_{ij} \geq 1$, --

Signed and Sealed this

Eighth Day of July, 2008

JON W. DUDAS
*Director of the United States Patent and Trademark Office*